(12) United States Patent
Ito

(10) Patent No.: US 6,288,838 B1
(45) Date of Patent: Sep. 11, 2001

(54) VIDEO-TYPE STEREOSCOPIC MICROSCOPE INCLUDING MOVABLE FIELD STOP FRAME AND HOLDER

(75) Inventor: Eiichi Ito, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/585,648

(22) Filed: Jun. 1, 2000

(30) Foreign Application Priority Data

May 31, 1999 (JP) ................................................. 11-150833

(51) Int. Cl.[7] ............................. G02B 21/22; G02B 21/36
(52) U.S. Cl. ........................................... 359/377; 359/363
(58) Field of Search .................................... 359/363, 369, 359/376, 377, 380

(56) References Cited

U.S. PATENT DOCUMENTS 5,825,532  10/1998  Mochizuki et al. .

6,126,287 * 10/2000  Akiyama ............................ 351/222

* cited by examiner

Primary Examiner—Jon Henry
(74) Attorney, Agent, or Firm—Pitney, Hardin, Kipp & Szuch LLP

(57) ABSTRACT

Right and left image taking optical systems are respectively composed of an objective optical system forming an image of an object, and a relay optical system relaying the image formed by the objective optical system on the corresponding region on the CCD. At the surface of the image formed through each of the objective optical system, a field stop is disposed to shield a region on the CCD that does not correspond to itself. Each of the field stops is embedded in a field stop frame. The field stop frame penetrates the corresponding field stop holder in the vertical direction and is rotatably held. Each of the field stop holders is movably supported by a base frame such that it can slide in a direction perpendicular to the optical axes of both of the objective optical systems.

11 Claims, 20 Drawing Sheets

VIDEO-TYPE STEREOSCOPIC MICROSCOPE INCLUDING MOVABLE FIELD STOP FRAME AND HOLDER

BACKGROUND OF THE INVENTION

1. Field of the Invention

The present invention relates to a video-type stereoscopic microscope for taking a moving picture of a magnified three-dimensional image of an object, and more particularly, to a video-type stereoscopic microscope in which an object is first imaged at a position of a field stop, and the image of the object is re-focused onto an image taking surface together with the image of the field stop.

2. Description of the Related Art

This type of video-type stereoscopic microscope is used when tiny tissues, such as a brain, are operated.

Since it is difficult to observe a structure of an organ consisting of tiny tissues, such as a brain, by direct viewing, the operations for such an organ must be proceeded under a microscope. Besides, since it is impossible to observe the three-dimensional structure of a tissue with a monocular microscope, a stereoscopic microscope has been used to enable three-dimensional magnifying observation of the tissue in order to perform accurate operations.

However, with the conventional optical stereoscopic microscope, although a lead surgeon or his/her assistant can observe the microscopic image, other staffs such as anesthetists, nurses, interns, and advisers who work at some remote locations cannot observe the same microscopic image. Therefore, they could not pursue their share of tasks with sufficient accuracy and promptness. Similarly, the adviser could not provide timely and proper advice from the remote locations. Accordingly, in recent years, a video-type stereoscopic microscope, which takes moving pictures of right and left images of an object formed by the stereoscopic microscope to provide the images for three-dimensional observation through a plurality of monitors, has been proposed, instead of an optical stereoscopic microscope.

For example, Japanese Patent No. 2607828 discloses a video-type stereoscopic microscope in which the optical axes of right and left objective optical systems are guided towards an image taking surface of a single image pick-up device side by side through a plurality of lenses, and therefore the right and left images of the object are formed on the image taking surface side by side.

Although the patent does not disclose the detailed structure of the video-type stereoscopic microscope, the following construction can be speculated from the disclosure in order that the right and left images of the object may be arranged in the image taking surface which has a limited aspect ratio without the right and left images overlapping with each other: A boarder line is defined on the image taking surface to partition it into the respective right and left regions on which the right and left images of the object are picked up, respectively. The images of the object are formed as aerial images through the right and left objective optical systems, and portions of the aerial images that should be relayed on the image taking surface so as to lap over the boarder line from the corresponding region are shielded by field stops of knife edge type. Then, the remaining portions of the aerial images are re-foamed and picked up on the respective image taking regions.

If such a construction is adopted, the straight-line edge of each of the right and left aerial images which is formed by the respective field stop shielding the aerial image must be precisely relayed on the boarder line.

However, due to an insufficient precision of the supporting members for the field stops and due to installation errors of the field stops with respect to the supporting member, the straight-line edges of the right and left images may not always be relayed on the boarder line of the image taking surface. In many cases, the straight-line edges are tilted and/or translated with respect to the boarder line. Therefore, an adjusting mechanism for adjusting the angle and position of the knife edge of the field stop is required. Such an adjusting mechanism must have a simple structure in order to achieve precise angle adjustment and position adjustment for the field stop, because a stereoscopic microscope is a precision optical device.

SUMMARY OF THE INVENTION

Accordingly, the present invention is devised to obviate the above-mentioned problems and an object of the present invention is to provide a video-type stereoscopic microscope in which adjustment for angle and position of a field stop are conducted independently of each other without influencing the other, thereby facilitating the adjustments.

To achieve the above-mentioned object, the present invention provides a video-type stereoscopic microscope in which images of same object are formed through a pair of image taking optical systems arranged with a predetermined base length therebetween on two regions into which an image taking surface of an image pickup device is divided in a direction of said base length and in which the images are picked up by said image pickup device. Each of the image taking optical systems including an objective optical system forming a primary image of an object, a relay optical system relaying the primary image formed by the objective optical system to form a secondary image, an inter-axis distance reducing element that brings the object light rays from the relay optical system close to each other, a field stop that shields a space that is conjugate, with respect to the relay optical system, with a region in the image taking surface that corresponds to the other image taking optical system when disposed at a predetermined position in a plane on which the primary image is formed by the objective optical system, a field stop frame that holds the field stop in its inner space, a field stop holder that holds the field stop frame such that the field stop frame can be rotated in a plane perpendicular to an optical axis of the objective optical system and a support mechanism that supports the field stop holder such that the field stop holder can slide in a direction perpendicular to the optical axis of the objective optical system while maintaining an rotational axis of the field stop frame in parallel with the optical axis of the objective optical system.

With this construction, by rotating the field stop frame relative to the field stop holder, an operator can adjust the angle of the field stop without changing the position of the field stop. Further, by sliding the field stop holder, the operator can adjust the position of the field stop without changing the angle of the field stop. Accordingly, adjustment for angle and for position of the field stop can be conducted independently of each other without affecting the other, thereby facilitating the adjustments.

In the condition where the angle and position of the field stop of each image taking optical system is properly adjusted, the field stop shields a portion of the primary image of the object formed by the objective optical system of each image taking optical system, which is conjugate, with respect to the relay optical system of that image taking optical system, with a region in the image taking surface that corresponds to the other image taking optical system. Therefore, the remaining portion of the primary image that is not shielded by the field stop is relayed by the relay optical system along the optical axis, and is imaged onto a region in the image taking surface that corresponds to its own image taking optical system. Accordingly, the secondary images of the same object can be arranged side by side on the same image taking surface without overlapping.

The supporting mechanism can be modified as long as it can slide a field stop holder linearly. For example, a linear guide and a slider, such as a rail and a shaft, can be used. Also, it is desirable that the supporting mechanism have a field stop holder driving mechanism. As such a driving mechanism, standard techniques of screw engagement and other mechanisms, such as ball screws, rack and pinion or the like, may be used. If guide pins are common to supporting mechanisms of both image taking optical systems, the respective moving directions of the field stops of both image taking optical systems can be aligned with each other, which prevents errors in the moving directions of the field stops. Further, in that case, two guide pins having a thread on one end may be arranged in directions opposite to each other and one end of each guide pin may be engaged with one field stop holder while the other end of the other guide pin is slidably inserted in the same field stop holder. With such a construction, by rotating one of the guide pins as a whole, the corresponding field stop holder can be driven individually.

BRIEF DESCRIPTION OF DRAWINGS

The invention will be described below in detail with reference to the accompanying drawing, in which.

DESCRIPTION OF THE PREFERRED EMBODIMENT

The preferred embodiments of the present invention will now be described in detail below with reference to the accompanying drawings.

A video-type stereoscopic microscope (hereafter referred to as "stereoscopic microscope" for simplicity) according to the present embodiment is incorporated in a surgical operation supporting system that is used in cerebral surgical operations, for example. In this surgical operation supporting system, the three-dimensional image (stereovision image) of a tissue of a patient, which is taken by a stereoscopic microscope, is combined with CG (Computer Graphic) images, which is created from data about a diseased part in the tissue, in advance. The combined image is displayed on a stereoscopic viewer for a lead surgeon and on monitors for other staffs, and simultaneously recorded by a recording device.

The Overall Configuration of the Surgical Operation Supporting System

Figure 1:
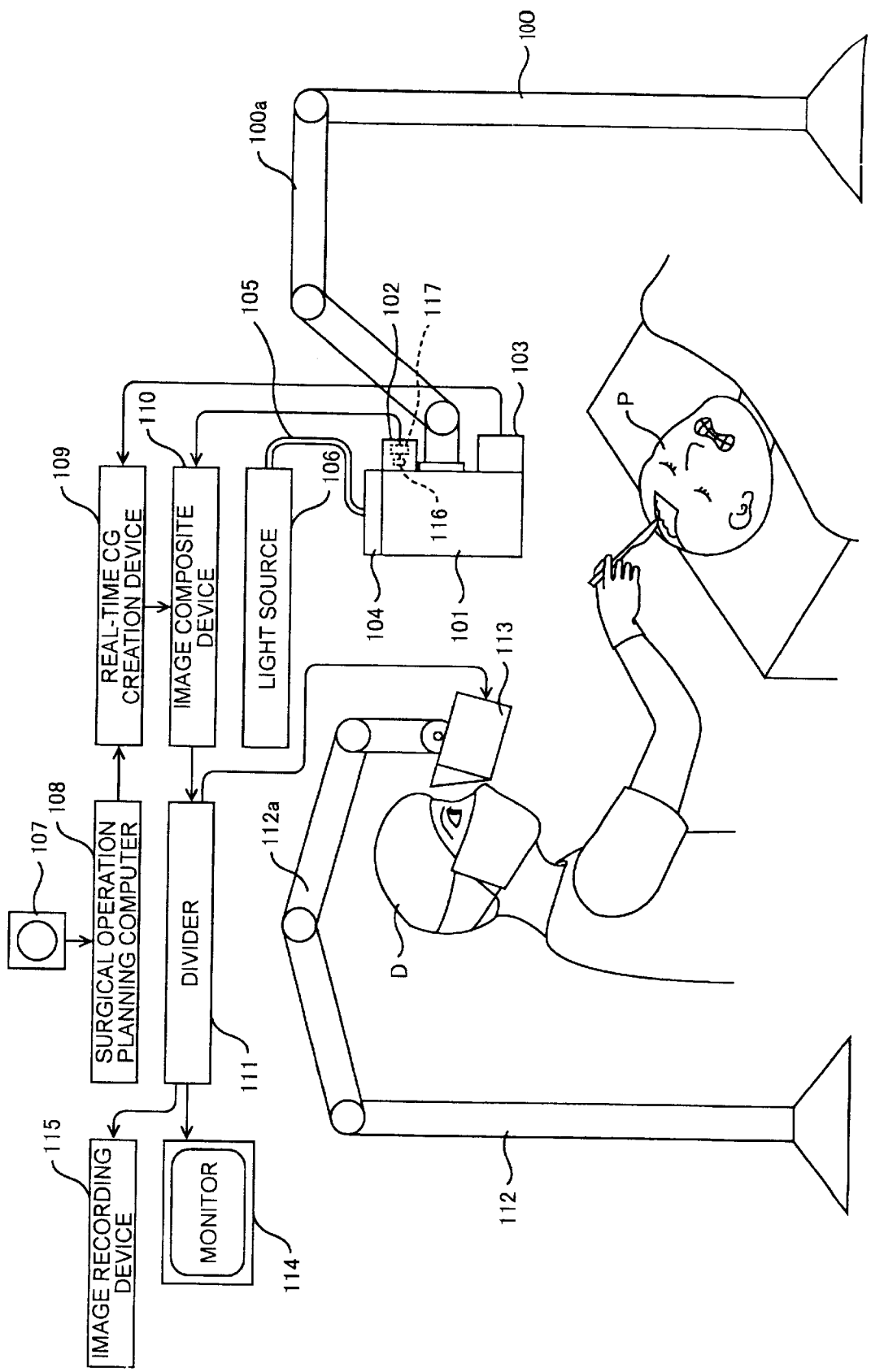
FIG. 1 is a schematic view showing an overall construction of a surgical operation support system equipped with a video-type stereoscopic microscope according to a preferred embodiment of the present invention.

FIG. 1 schematically shows an arrangement of the surgical operation supporting system. As shown in this figure, the surgical operation supporting system is composed of a stereoscopic microscope 101, a high definition CCD camera 102 attached on the upper end of the back surface of the stereoscopic microscope 101, a microscope position measurement device 103 attached on the lower end of the back surface of the stereoscopic microscope 101, a counter weight 104 attached on the top of the stereoscopic microscope 101, a light guide fiber bundle 105 inserted into the interior of the stereoscopic microscope 101 through a center hole made in the counter weight 104, a light source 106 emitting illumination light to be introduced into stereoscopic microscope 101 through the light guide fiber bundle 105, a surgical operation planning computer 108 having a disk device 107, a real-time CG creation device 109 connected to the microscope position measurement device 103 and to the surgical operation planning computer 108, an image composite device 110 connected to this real-time CG creation device 109 and the high definition CCD camera 102, a divider 111 connected to the image composite device 110, an image recording device 115, and a monitor 114 and a stereoscopic viewer 113 which are connected to the divider 111.

The disk device 107 stores image data, such as CT scan image data, MRI image data, SPECT image data, blood flow field image data, that have been obtained through various detecting process with respect to a diseased part of a patient P. The disc device 107 also stores three-dimensional graphic data of the diseased part and its surrounding tissues, which have been created based on the various kinds of image data in advance. The three-dimensional graphic data represents shape, size and position of the diseased part and its surrounding tissues in a three-dimensional local coordinate system that is defined with a predetermined reference point set on the outer skin or surface of internal tissues of the patient as origin, in accordance with vector format or map format.

The stereoscopic microscope 101 has a mount on its back surface and is detachably fixed to the distal end of a free arm 100a of a first stand 100 through the mount. Thus, the stereoscopic microscope 101 can be moved within the space where the free arm 100a of the first stand 100 can reach, and can also be inclined in an arbitrary direction. Hereinafter, the object side (that is, patient side) relative to the stereoscopic microscope 101 will be defined as "low", and the opposite side as "high", so that understanding thereof may be easy.

Since the optical configuration in this stereoscopic microscope 101 will be explained in detail later, only its schematics thereof will be explained here.

Figure 2:
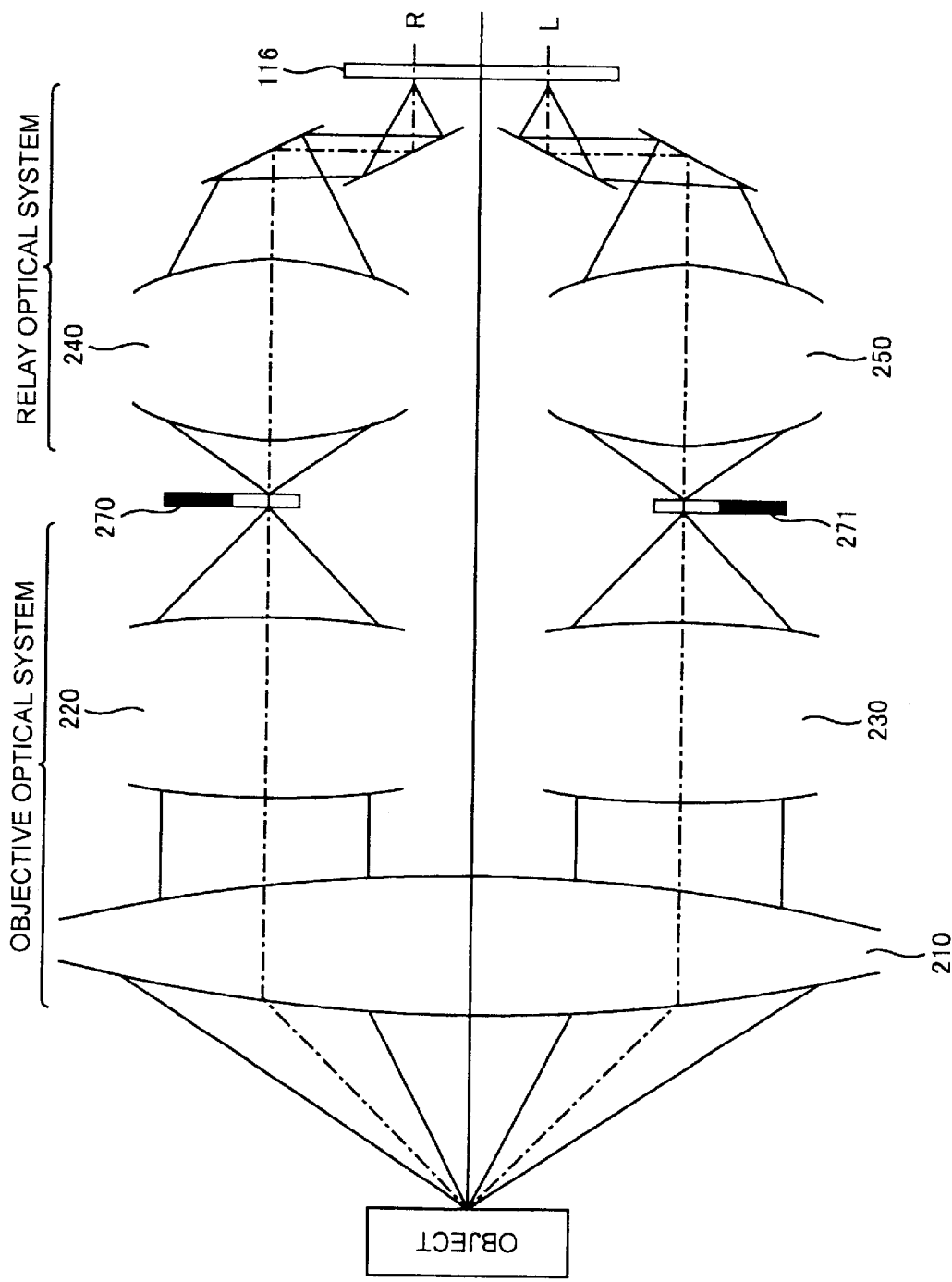
FIG. 2 is a schematic view showing an optical construction in the video-type stereoscopic microscope.

As shown in FIG. 2, primary images of an object are formed as aerial images at respective positions of right and left field stops 270, 271 through an objective optical systems including a large-diameter close-up optical system 210 having a single optical axis and a pair of right and left zoom optical systems 220, 230, which respectively focus light rays that have passed through different portions of the close-up optical system 210. A pair of right and left relay optical systems 240, 250 relay the right and left primary images to from right and left secondary images on the right and left image taking regions in an image taking surface of a CCD 116 mounted in the high definition CCD camera 102, respectively. Each of the image taking regions has a vertical to horizontal aspect ratio of 9:8, while the image taking surface of the CCD 116 has a "high definition" size of which aspect ratio of vertical to horizontal is 9:16.

The close-up optical system 210, the right zoom optical system 220, and the right relay optical system 240 together constitute a right image taking optical system. The close-up optical system 210, the left zoom optical system 230, and the left relay optical system 250 together constitute the left image taking optical system. The close-up optical system 210 is common to the right and left image taking optical systems.

The right and left zoom optical systems 220, 230 and the right and left relay optical systems 240, 250 are arranged with a predetermined base length therebetween.

The images which are thus formed on the right and left image taking regions of the image taking surface of the CCD 116 through the pair of image taking optical systems are equivalent to stereovision images including a pair of images taken from two locations which are separated from each other by the predetermined base length, which are arranged side by side. An output signal from this CCD 116 is converted to a high definition video signal by the image processor 117, and is outputted from the high definition CCD camera 102 to the image composite device 110.

The stereoscopic microscope 101 contains an illuminating optical system 300 (see FIG. 6) for illuminating the object that is located in the vicinity of the focal point of the close-up optical system 210. Illuminating light from the light source 106 is introduced into this illuminating optical system 300 via the light guide fiber bundle 105.

Returning to FIG. 1, the microscope positioning measurement device 103 measures the distance to the object that exists on the optical axis of the close-up optical system 210, the three-dimensional orientation of the optical axis of the close-up optical system 210, and the position of the above-mentioned reference point. The microscope positioning measurement device 103 then calculates the position of the object in the above-mentioned local coordinate system based upon these measurements. The information about the orientation of the optical axis and the position of the object is sent to the real-time CG creation device 109.

This real-time CG creation device 109 creates real-time CG images, such as wire frame images, of a diseased part such as a tumor based on the information about the orientation of the optical axis and the position of the object which are sent from the microscope position measurement device 103, and based on the three-dimensional data down-loaded from the operation planing computer 108. These CG images are so created that they are equivalent to the stereoscopic images as viewed along the optical axis direction with the same base length and the same distance as those of the optical system of the stereoscopic microscope 101. The real-time CG creation device 109 outputs CG image signals representing the created CG images to the image composite device 110, one after another.

This image composite device 110 superimposes the CG image signals obtained by the real-time CG creation device 109 onto the high definition video signal of the actual object, which is inputted from the high definition CCD camera 102, with appropriately adjusting its scale. In the image represented by the high definition video signal superimposed with the CG image signal, the shape, size and the position of the diseased part are indicated as CG images (such as wire frame images) on the real image thereof. The thus superimposed high definition video signals are divided by the divider 111, and are supplied to the stereoscopic viewer 113 for a lead surgeon D, to the monitor 114 for other surgical staffs or an advisor at a remote location, and to the recording device 115, respectively.

The stereoscopic viewer 113 is attached to the distal end of a free arm 112a of a second stand 112 in the downward direction, so that the stereoscopic viewer 113 can be suitably positioned in accordance with a posture of the lead surgeon D that facilitates his/her operations. The schematic structure of this stereoscopic viewer 113 is shown in FIG. 3.

Figure 3:
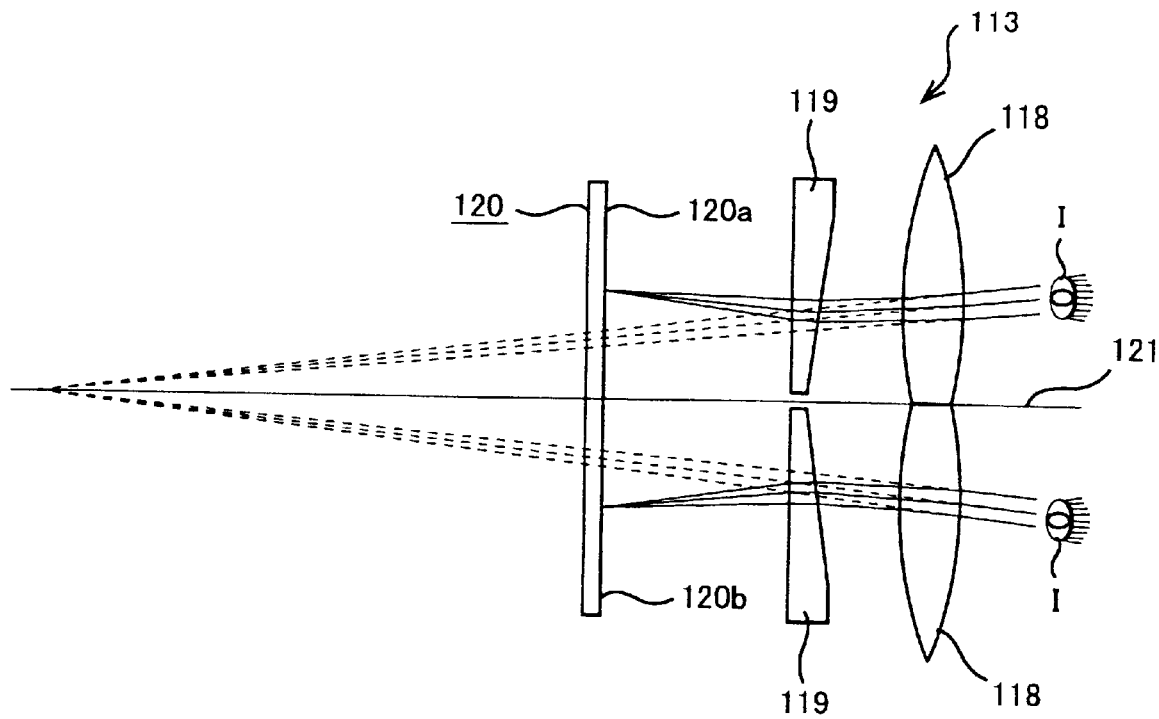
FIG. 3 is a schematic view showing an optical construction of a video-type stereoscopic viewer.
Figure 4:
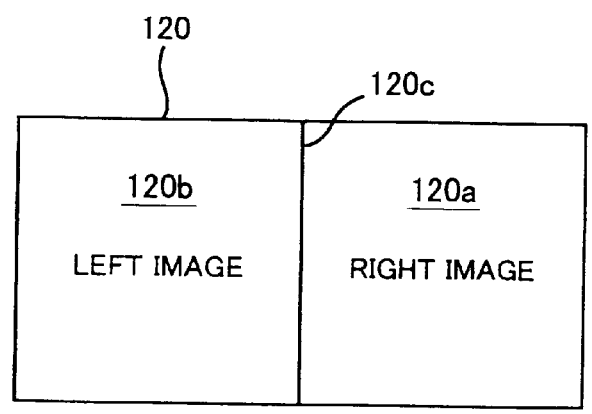
FIG. 4 is a plan view of an LCD panel.

As shown in the FIG. 3, the stereoscopic viewer 113 contains a high-definition-sized LCD panel 120 having an aspect ratio of 9:16 as a monitor. When the high definition video signal from the divider 111 is inputted into the LCD panel 120, as shown in the plan view of FIG. 4, the left half 120b of the LCD panel 120 displays the image taken by the left image taking region of CCD 116, and the right half 120a thereof displays the image taken by the right image taking region of CCD 116. A boundary 120c of these right and left images may be shifted or tilted depending upon adjustment of field stops 270, 271, which will be explained later.

The light paths in the stereoscopic viewer 113 are divided into the right and the left by a partition 121, which is installed along a direction perpendicular to the LCD panel 120 at the boundary 120c which emerges when the field stops 270, 271 are properly adjusted. At each side of the partition 121, a wedge prism 119 and an eyepiece 118 are disposed in that order from the side of LCD panel 120. The eyepiece 118 forms a magnified virtual image of the image displayed on the LCD panel 120 at a position that is located 1 m (−1 diopter) in front of observing eyes I. The wedge prism 119 adjusts the direction of the light such that the angle of convergence of the observing eyes I may correspond to that in case of observing an object placed 1 m in front of the eye I naked, thereby enabling natural three-dimensional observation.

As described above, the images obtained by the stereoscopic microscope 101 are superimposed with CG image such as a wire frame, which is created based upon images taken by various image-taking devices in advance, in order to show the shape, size, and the position of the diseased part. The superimposed images are viewed as three-dimensional images through the stereoscopic viewer 113 and displayed by the monitor 114. Accordingly, the lead surgeon D and other surgical staffs who are observing these images can easily identify the diseased part, which would be difficult to be identified with actual images only. Thus, the surgical operations can be conducted in a fast and accurate manner.

The Configuration of the Stereoscopic Microscope

Figure 5:
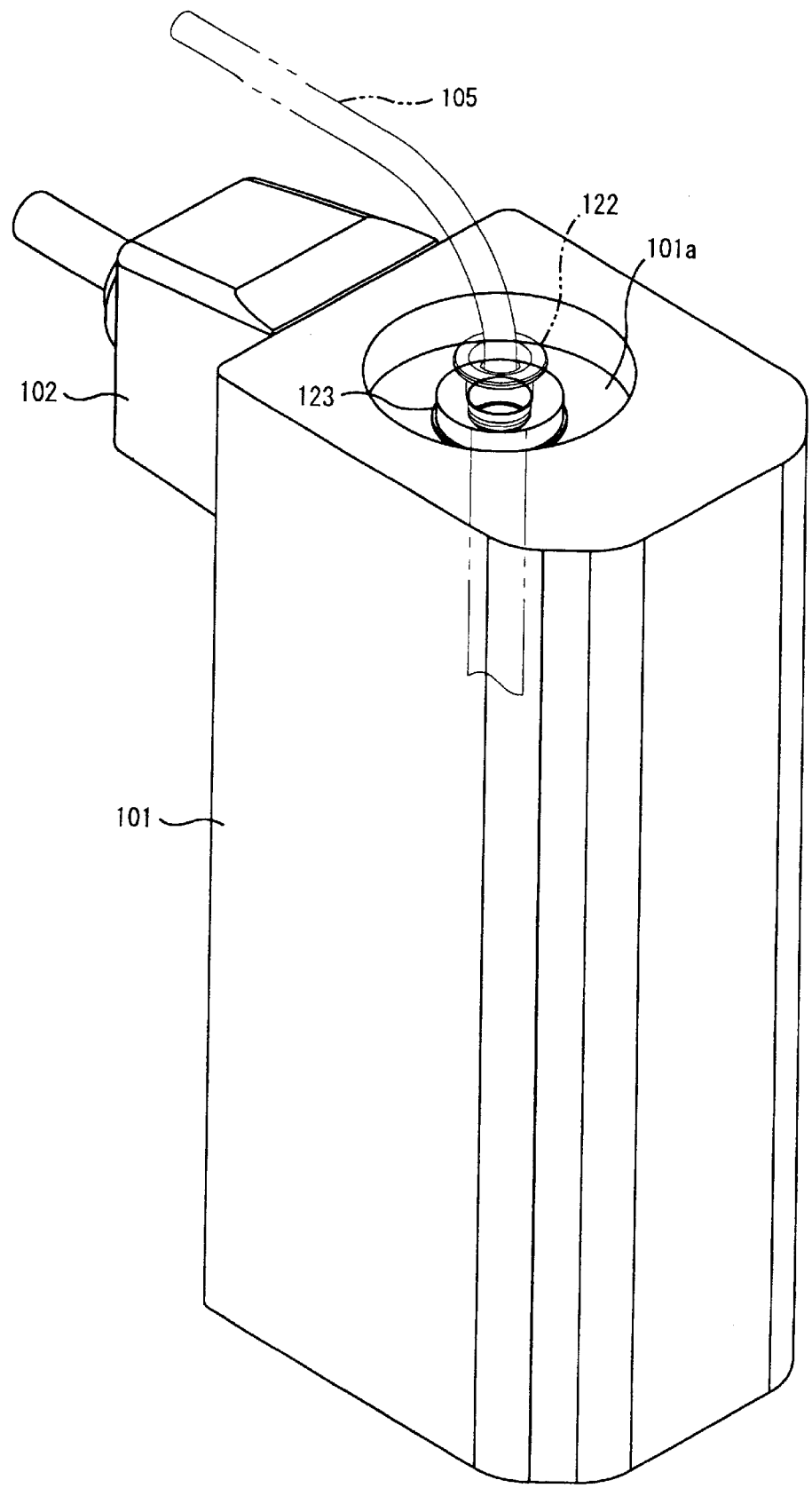
FIG. 5 is a perspective view showing an outer appearance of the stereoscopic microscope.

The structure of the above-mentioned stereoscopic microscope 101 (including the high definition CCD camera 102) is explained in more detail. As shown in FIG. 5, this stereoscopic microscope 101 has a shape of substantially polygonal column. The back surface of the stereoscopic microscope 101 is flat and is attached with the high definition CCD camera 102, and the front surface (that is, the opposite side of the back surface) has chamfered edges on both sides. At the center of the top surface, a circular recess 101a is formed. At the center of the recess 101a, an insertion opening (not illustrated) is bored so as to be inserted with a guide pipe 122, which is a cylindrical member fixedly covering the distal end of the light guide fiber bundle 105. Here, an annular-shaped member (that is, fiber guide insertion part) 123 attached to the insertion opening is a chuck for fixing the guide pipe 122 inserted into the insertion opening.

<Optical Configuration>

Figure 6:
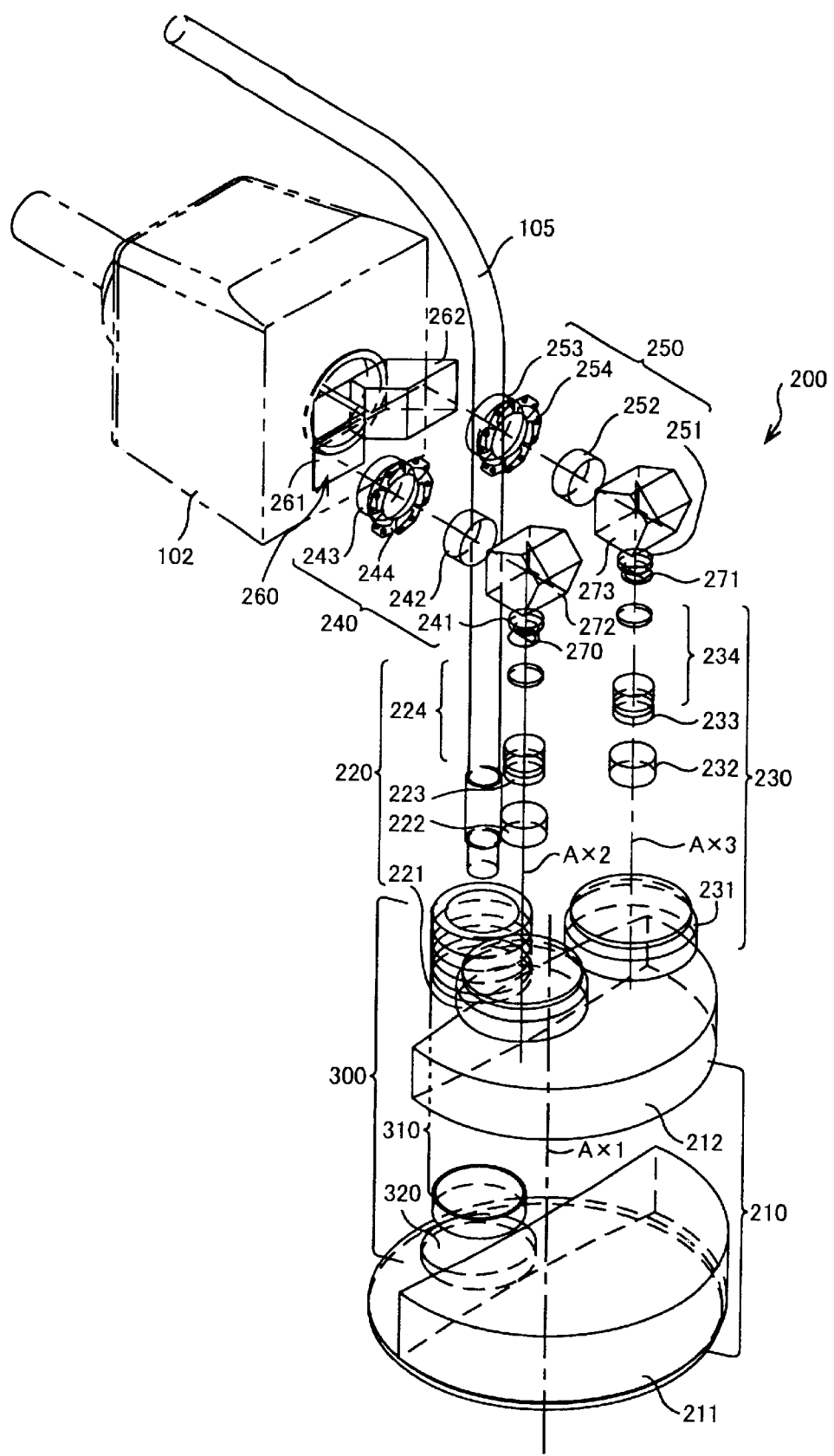
FIG. 6 is a perspective view showing an overall construction of a microscope optical system.
Figure 7:
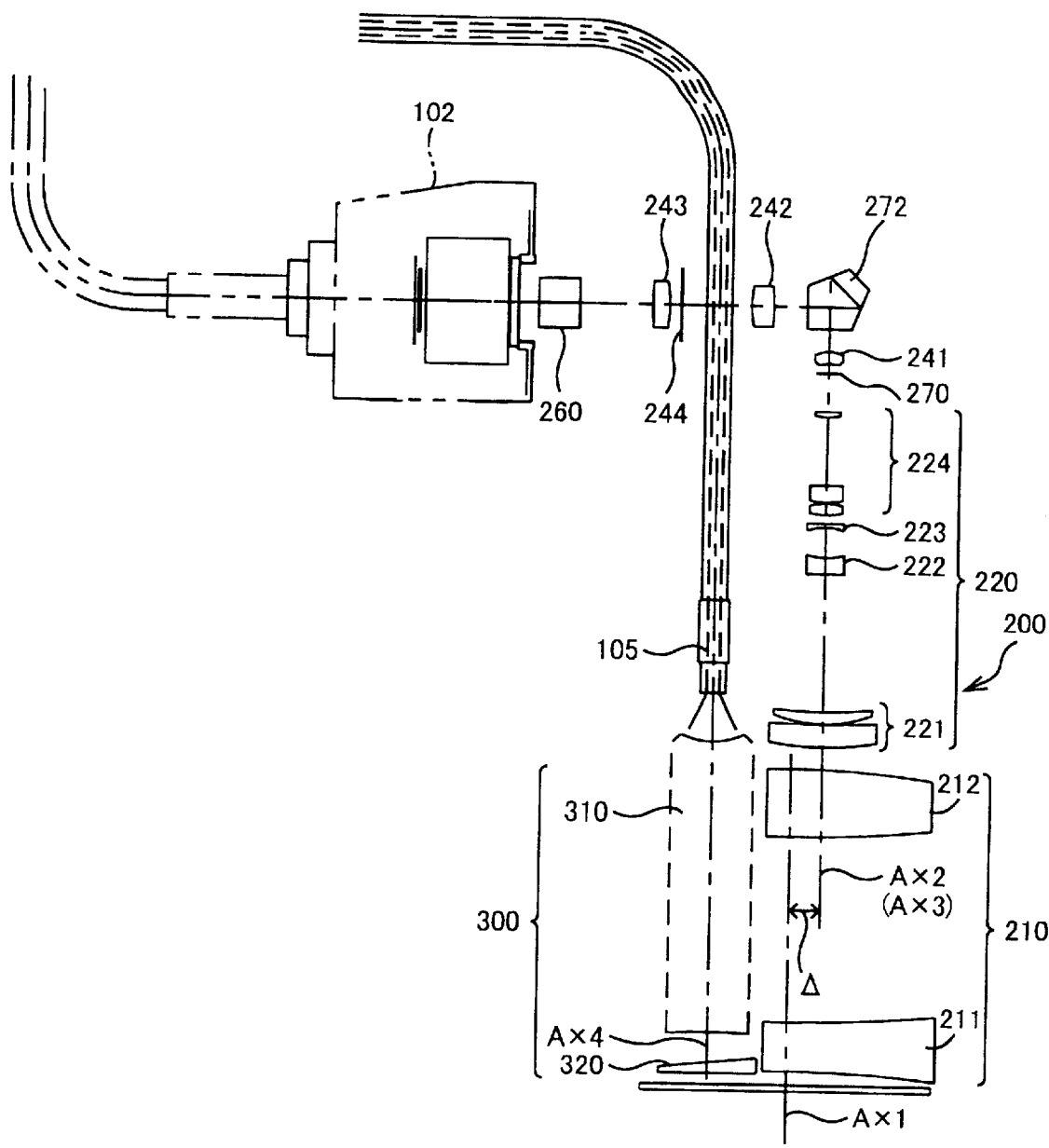
FIG. 7 is a side view showing an overall construction of the microscope optical system.
Figure 8:
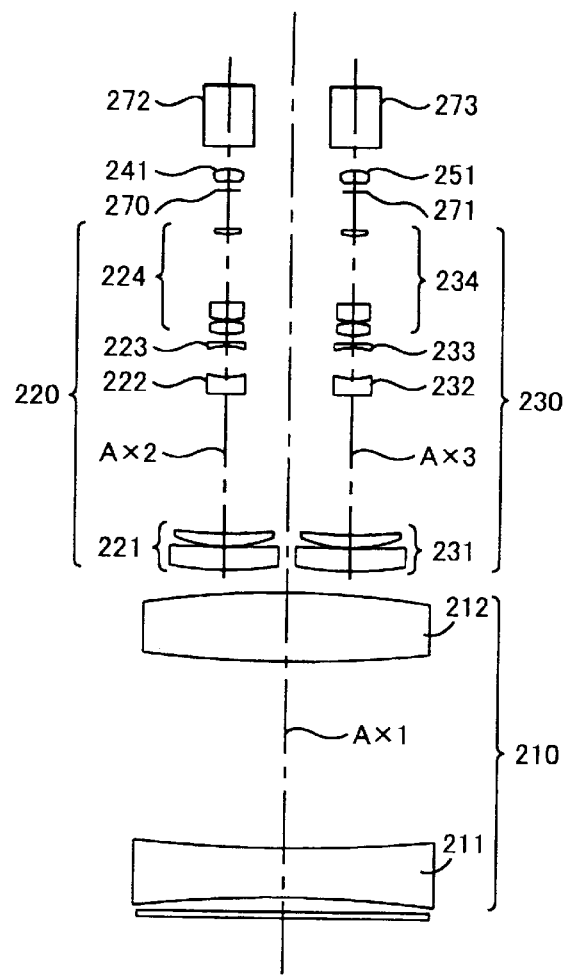
FIG. 8 is a front view showing an overall construction of the microscope optical system.
Figure 9:
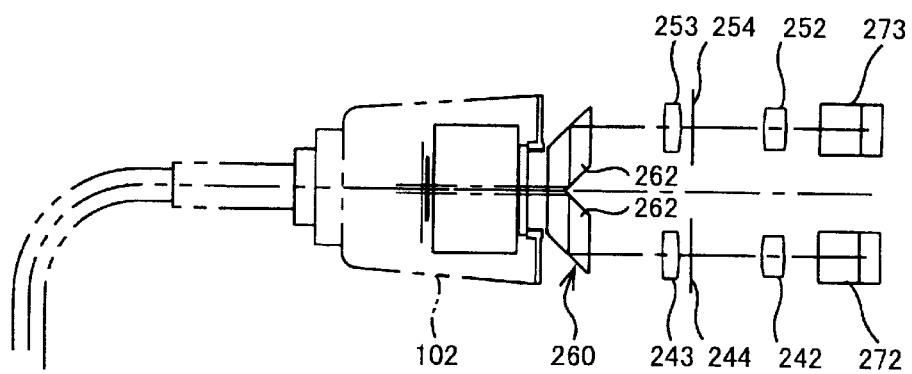
FIG. 9 is a plan view showing an overall construction of the microscope optical system.

Next, the optical configuration of the stereoscopic microscope 101 will be explained with reference to FIGS. 6 to 9. FIG. 6 is a perspective view of an overall structure of the microscopic optical system; FIG. 7 is a side view; FIG. 8 is a front view; and FIG. 9 is a plan view of the microscopic optical system.

As shown in FIG. 6, the microscopic optical system includes an image taking optical system (a pair of right and left image taking optical systems) 200 for electrically taking an image of an object, and an illuminating optical system 300 for illuminating the object with illuminating light guided from the light source 106 through the light guide fiber bundle 105.

The image taking optical system 200 includes an objective optical system, which includes a common close-up optical system 210 and a pair of right and left zoom optical systems 220, 230, for forming the primary images of the object; a pair of right and left relay optical systems 240, 250 for forming the secondary images by relaying the primary images; and an inter-axis distance reducing prism 260 as an inter-axis distance reducing element that brings the object light rays from the relay optical systems 240, 250 close to each other.

Also, at the positions where the primary images are formed by the zoom optical systems 220, 230, field stops 270, 271 are respectively disposed. In the relay optical systems 240, 250, pentagonal prisms 272, 273 are placed as optical path deflecting elements for deflecting the respective light paths at the right angle.

According to this construction, right and left images with a predetermined parallax can be formed on adjacent two regions of the CCD 116 installed in the CCD camera 102. Here, in the following explanations of optical systems, a "horizontal direction" is the direction that coincides with the longitudinal direction of the image taking surface of the CCD 116 when images are projected thereon, and a "vertical direction" is the direction that is perpendicular to the horizontal direction relative to the CCD 116.

Each of the optical systems will be explained hereinafter.

As shown in FIGS. 6, 7 and 8, the close-up optical system 210 includes a first lens 211 of a negative refractive power, and a second lens 212 of a positive refractive power arranged in that order from the object side. The second lens 212 moves along the optical axis direction for focusing in accordance with the object distance.

That is, since the second lens 212 is adjusted so that an object is placed at the object-side focal point of the close-up optical system 210, the close-up optical system 210 behaves like a collimator lens to convert divergent light from the object into substantially parallel light.

The plane shape of each of the first and second lenses 211, 212 of the close-up optical system 210, as viewed from the zoom optical systems 220 and 230, is a semicircular shape in which one side is cut out (D-cut). The illuminating optical system 300 is disposed at the cutout portions.

A pair of zoom optical systems 220, 230 focus afocal object light from the close-up optical system 210 at the positions of the field stops 270, 271, respectively.

As shown in FIGS. 6 to 8, the right zoom optical system 220 includes first through fourth lens groups 221, 222, 223 and 224 of positive, negative, negative and positive refractive powers, respectively, in that order from the side of the close-up optical system 210. The first and fourth lens groups 221, 224 are fixed, and the second and third lens groups 222, 223 move for zooming along the optical axis direction. The second lens group 222 moves mainly to change the magnification, and the third lens group 223 moves to maintain the focal position.

Like the right zoom optical system 220, the left zoom optical system 230 includes the first through fourth lens groups 231, 232, 233, and 234. The right and left zoom optical systems 220, 230 are interlocked by a driving mechanism (not shown in the figures), whereby the magnifications of the right and left images can be changed simultaneously.

The optical axes Ax2, Ax3 of the zoom optical systems 220, 230 are in parallel with the optical axis Ax1 of the close-up optical system 210. A first plane that includes these optical axes Ax2, Ax3 of the zoom optical systems 220, 230 is offset from a second plane, which is parallel to the first plane and includes the optical axis of the close-up optical system 210, by a distance at the opposite side of the D-cut portion.

The diameter of the close-up optical system 210 is set to be larger than the diameter of a circle that includes the maximum effective diameters of the zoom optical systems 220, 230 and the maximum effective diameter of the illuminating optical system 300. As described above, since the optical axes Ax2, Ax3 of the zoom optical systems 220, 230 are positioned oppositely to the D-cut portion with respect to the optical axis Ax1, the illuminating optical system 300 can be placed inside of a circular region defined by the diameter of the close-up optical system 210, thereby enabling a compact overall construction.

The field stops 270, 271 are disposed on design positions at which the primary images are to be formed by the zoom optical systems 220, 230 having designed performance. As shown in FIG. 6, each of the field stops 270, 271 has a circular outline shape, and have a semi-circular aperture concentric with circular outline on the inner side in the horizontal direction. The field stops 270, 271 are disposed such that the straight edges of these apertures coincide with the vertical direction corresponding to the boarder line of the right and left images on the CCD 116, and such that only the inner parts of light flux can be transmitted.

The microscope according to the present embodiment needs to avoid overlapping of the right and left images on the CCD 116 in order to form the right and left secondary images on adjacent regions of the single CCD 116. Therefore, the field stops 270, 271 are placed at the position of the respective primary images. The straight-line edge of the semi-circular shaped aperture of each of those field stops 270, 271 functions as a knife-edge, so that only light rays traveling inside the edge can pass through the field stop 270, 271. The primary images formed on the field stops 270, 271 are re-imaged through the right and left relay optical systems 240, 250 as secondary images. The resultant secondary images are reversed in the horizontal direction and in the vertical direction with respect to the primary images. Thus, the knife edges defining the outside edges in the horizontal direction at the positions of the primary images define the inside edges in the horizontal directions at the positions of the secondary images, which clearly defines the boundary of the right and left images.

The relay optical systems 240, 250 includes three lens groups of positive refractive powers, respectively. As shown in FIGS. 6 and 7, the right relay optical system 240 includes a first lens group 241 composed of a single positive meniscus lens, a second lens group 242 having a positive refractive power as a whole, and a third lens group 243 composed of a single biconvex lens. The object side focal point of the combination of the first and second lens groups 241 and 242 is coincident with the image forming plane of the primary image formed by the zoom optical system 220. That is the same position as the field stop 271. The third lens group 243 converges parallel light transmitted from the second lens group 242 onto the image taking surface of the CCD 116. Between the first lens group 241 and the second lens group 242, the pentagonal prism 272 is disposed for deflecting the light path at the right angle. Between the second lens group 242 and the third lens group 243, an aperture stop 244 is installed for adjusting the light amount.

Like the right relay optical system 240, the left relay optical system 250 includes the first, second and third lens groups 251, 252 and 253. The pentagonal prism 273 is disposed between the first lens group 251 and the second lens group 252, and an aperture stop 254 is installed between the second lens group 252 and the third lens group 253.

The divergent light that has passed through the field stops 270, 271 is converted to substantially parallel light through the first lens groups 241, 251 and the second lens groups 242, 252 of the relay optical systems. After passing through the aperture stops 244, 254, the light rays are re-converged through the third lens groups 243, 253 to form the secondary images.

Since the pentagonal prisms 272, 273 are disposed inside the relay optical systems 240, 250, the total length of the image taking optical system 200 along the optical axis Ax1 of the close-up optical system 210 can be shortened. Further, if a mirror is used as the optical path deflecting element, a setting angle error of the mirror largely deviates the direction of the reflected light. On the other hand, the pentagonal prism keeps the direction of the reflected light when it rotates around an axis that is perpendicular to a plane including the optical axis of the zoom optical system before and after the deflection by the pentagonal prism.

Further, the second lens groups 243, 252 and the third lens groups 243, 253 in the relay optical systems 240, 250 are adjustable in the direction of the optical axis and in the direction perpendicular to the optical axis. When the second and third lens groups 242, 252, 243, 253 move along the optical axis direction, the resultant focal lengths of the first and second lens groups vary, which changes the magnification (the image height of the secondary images) of the relay optical systems 240, 250. Furthermore, adjustments of the third lens groups 243, 253 along the optical axis direction change the back focus of the relay optical systems, which enables the focus adjustment with respect to the CCD 116. In addition, when the second lens groups 242, 252 and the third lens groups 253, 253 are adjusted as a unit in a direction perpendicular to the optical axis, the positions of the secondary images are adjusted in a plane perpendicular to the optical axis.

For such adjustments, the second lens group 242 and the third lens group 243 in the right relay optical system 240 are held in a unitary outer lens barrel, and the third lens group 243 is further held in an inner lens barrel, which is movable relative to the outer lens barrel in the direction of the optical axis. In the same manner, the second lens group 252 and the third lens group 253 in the left relay optical system 250 are held in an outer lens barrel and the third lens group 253 is further held in an inner lens barrel.

Since the second lens groups 242, 252 and the third lens groups 243, 253 are movable in this matter for enabling various adjustments, if the pentagonal prisms 272, 273 were placed between these lens groups, the adjustment mechanism would become more complex. Therefore, it is preferable to place the pentagonal prisms 272, 273 between the field stops 270, 271 and the second lens groups 242, 252. Moreover, since the degree of divergence of the object light is reduced by the first lens groups 241, 251, the pentagonal prisms 272, 273 are preferably placed between the first lens groups 241, 251 and the second lens groups 242, 252 in order to make the effective diameter of the pentagonal prisms smaller.

The inter-axis distance reducing prism 260 is disposed between the relay optical systems 240, 250 and the CCD camera 102 to reduce the distance between the right and left object light rays from the respective relay optical systems 240, 250. To attain real stereoscopic feeling by the stereoscopic observation, it is necessary to have a predetermined base length between the right and left zoom optical systems 220, 230 and between the right and left relay optical systems 240, 250. On the other hand, to form secondary images on the adjacent regions on the CCD 116, it is necessary to shorten the distance between the optical axes than the base length. The inter-axis distance reducing prism 260 brings the optical axes of the relay optical systems close to each other, which enables to form secondary images on the same CCD 116 while keeping the predetermined base length.

As shown in FIGS. 6 and 9, the inter-axis distance reducing prism 260 includes a pair of optical axis shifting prisms 261, 262 having shapes of the pentagonal columns, which are symmetric to each other. The prisms 261, 262 are arranged in a right and left symmetric configuration with a spacing of about 0.1 mm therebetween.

As shown in FIG. 9, each of the optical axis shifting prisms 261, 262 has incident and exit surfaces that are parallel to each other, and has first and second reflecting surfaces in the respective outer side and inner side, which are also parallel to each other. Viewed in the direction parallel to the incident and exit surfaces and reflecting surfaces, these optical axis shifting prisms 261, 262 have a pentagonal shape formed by cutting out an acute-angle corner of a parallelogram with a line perpendicular to the exit surface.

The object lights from the relay optical systems 240, 250 are incident on the incident surfaces of the respective optical axis shifting prisms 261, 262; internally reflected by the outer reflecting surfaces so as to be directed in the horizontal direction; internally reflected by the inner reflecting surfaces so as to be directed to the optical axis directions that are the same as the incident direction; and are exited from the exit surfaces so as to be incident on the CCD camera 102. As a result, the distance between the right and left object light rays is narrowed without altering the traveling directions, and the secondary images are formed on the single CCD 116.

The illuminating optical system 300 has the function of projecting illumination light onto the object, and, as shown in FIG. 6 and FIG. 7, includes an illuminating lens 310 for adjusting the degree of divergence of divergent light emitted from the light guide fiber bundle 105 and a wedge prism 320 for deflecting the illumination light to coincide the illuminating region with the image taking region. As shown in FIG. 7, the optical axis Ax4 of the illuminating lens 310 is parallel to the optical axis Ax1 of the close-up optical system 210, and is offset from the optical axis Ax1 by a predetermined amount. Therefore, if the wedge prism 320 is not disposed, the center of the illuminating region would not coincide with the center of the image taking region, which wastes some amount of illuminating light. The wedge prism 310 matches the illuminating region with the image taking region, which enables effective use of the illuminating light.

<Optical System Supporting Mechanism>

Figure 10:
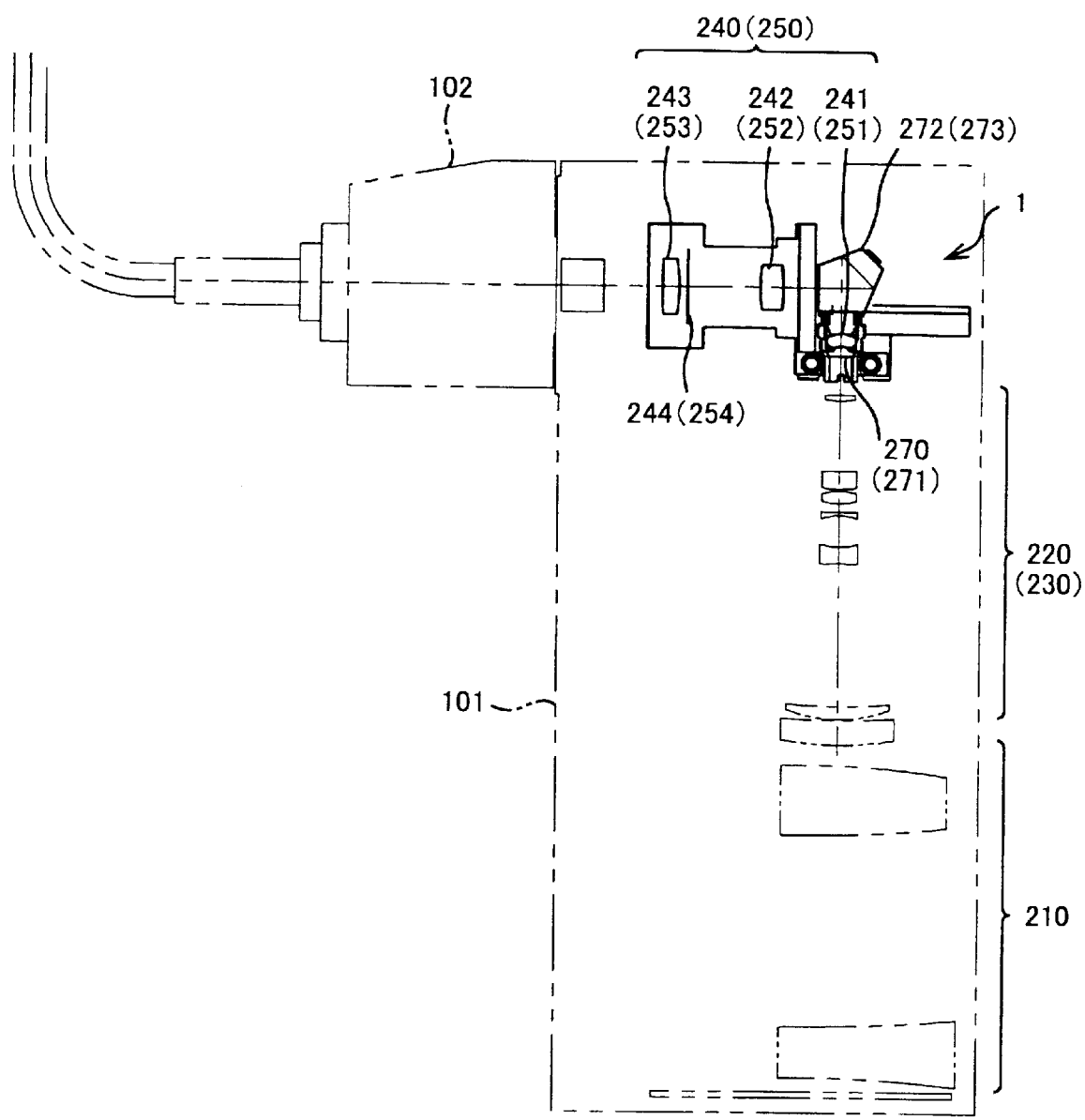
FIG. 10 is a perspective view showing a fixing position of a relay unit in a housing of the video-type stereoscopic microscope.

Next, the mechanical structure of a supporting mechanism, which supports the field stops 270, 271 and optical systems after the field stops 270, 271 in the above-mentioned image taking optical system 200, will be explained. As shown in FIG. 10, the relay optical systems 240, 250, which include the above-mentioned pair of right and left field stops 270, 271, the pentagonal prisms 272, 273 and the aperture stops 244, 254, are assembled as a single unit (relay unit 1), and are installed inside the housing of the stereoscopic microscope 101.

Figure 11:
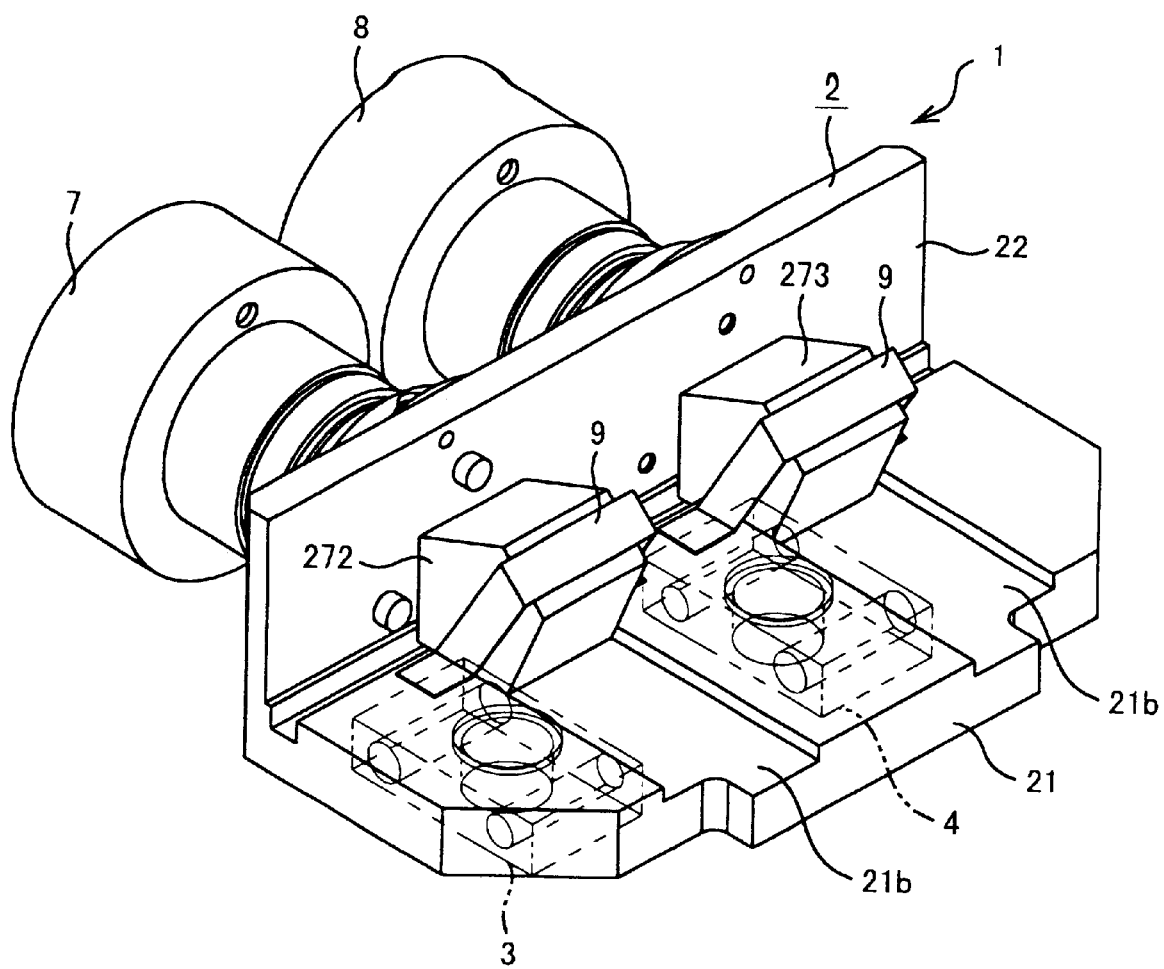
FIG. 11 is a perspective view of the relay unit as viewed from the upper front.
Figure 12:
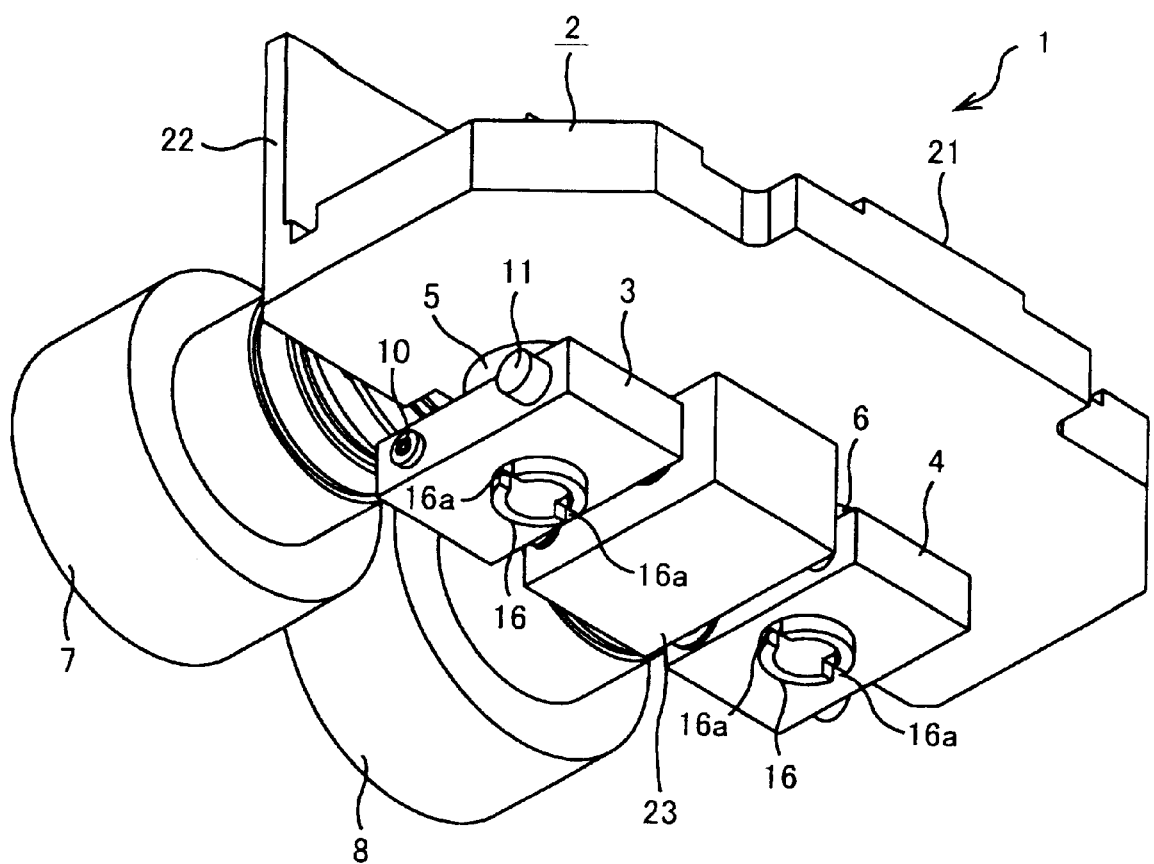
FIG. 12 is a perspective view of the relay unit as viewed from the lower front.

FIG. 11 is a perspective view of this relay unit 1, as viewed from the upper front. FIG. 12 is a perspective view of the relay unit 1, as viewed from the lower front. As shown in FIG. 11 and FIG. 12, the relay unit 1 is constructed of a base frame 2 that is to be fixed in the housing of the stereoscopic microscope 101, and a pair of field stop holders 3, 4, front lens barrels 5, 6, pentagonal prisms 272, 273 and rear lens barrels 7, 8 which are installed on the base frame 2. Each of these parts constituting the relay unit 1 will be explained one by one, hereinafter.

The base frame 2 has a cross-sectional shape like a letter "L" in a plane that includes the optical axis Ax2 (Ax3) of the relay optical system 240 (250) before and after the pentagonal prism 272 (273). The L-like shape of the base frame 2 is integrally formed of a plate like pentagonal prism base 21 that is perpendicular to the optical axis of the first lens group 241 (251) and a mount part 22 vertically extending from the rear end of the pentagonal prism base 21 (that is, the end at the side of the second lens group 242 (252)).

Figure 13:
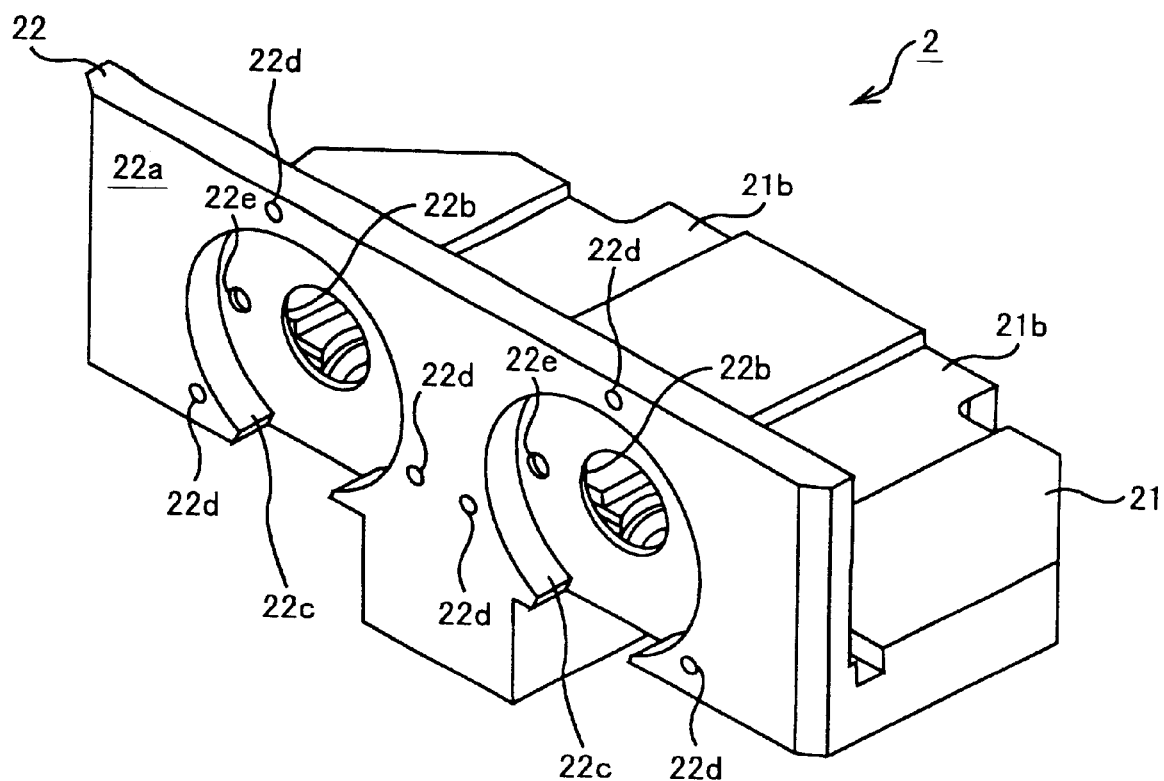
FIG. 13 is a perspective view of a base frame as viewed from the upper rear.

As shown in FIG. 13, which is a perspective view showing only the base frame 2 as viewed from rear side, a rear end surface 22a of the mount part 22 (at the side of the second lens group 242 (252)) is machined as a flat plane having a rectangular shape. Upon installation, the rear end surface 22a is to be aligned with a reference plane (not shown) formed in the interior of the housing of the stereoscopic microscope 101 so as to be precisely in parallel with a plane including both optical axes Ax2, Ax3 of the zoom optical systems 220, 230. Accordingly, this rear end surface 22a is referred for any working in the relay unit 101, and is termed as "working reference surface 22a" hereinafter.

This working reference surface 22a has through holes 22b, 22b disposed symmetrically in right-to-left direction. Each of the through holes 22b, 22b has a circular cross-section with its center at the passing position of the respective optical axis Ax2, Ax3 that have been bent at the right angle by the respective prism 272, 273, so as to allow the optical axes Ax2, Ax3 to pass through the mount part 22 when the relay unit 1 is fixed to the housing of the stereoscopic microscope 101. The surround of each through hole 22b on the working reference surface 22a is recessed as a spot facing 22c, which has an inner diameter three times as large as that of the through hole 22b and which is concentric with the through hole 22b, for fixing respective rear lens barrel 7, 8. Here, since each optical axis Ax2, Ax3 passes through a position slightly below the center of the working reference surface 22a in vertical direction, one portion of each spot facing 22c reaches the lower edge of the mount part 22 (that is, bottom surface of the pentagonal prism base part 21), so that the inner surface of the each spot facing 22c has an opening as the shape of a letter "C" as viewed from rear side.

Also, three threaded holes 22d are formed at the surround of each spot facing 22c on the working reference surface 22a, at an equal angular interval with respect to the center of the through hole 22b for fixing a de-center adjustment ring 30 (see FIG. 20 and FIG. 21) of each rear lens barrel 7, 8, which will be described later. Moreover, three fixing holes 22e are formed on the bottom surface of each spot facing 22c, at an equal angular interval with respect to the center of the spot facing 22c for fixing a second lens frame installation ring 31 (see FIG. 20 and FIG. 21) of each rear lens barrel 7, 8, which will also be described later.

On the other hand, the upper surface and lower surface of the pentagonal prism base 21 are manufactured so as to be precisely perpendicular to the working reference surface 22a, and also to be precisely in parallel with a plane including the center axes of both through holes 22b. Also, the planar outer edges of this pentagonal prism base 21 are formed along the inner shape of the housing of the stereoscopic microscope 101.

Figure 20:
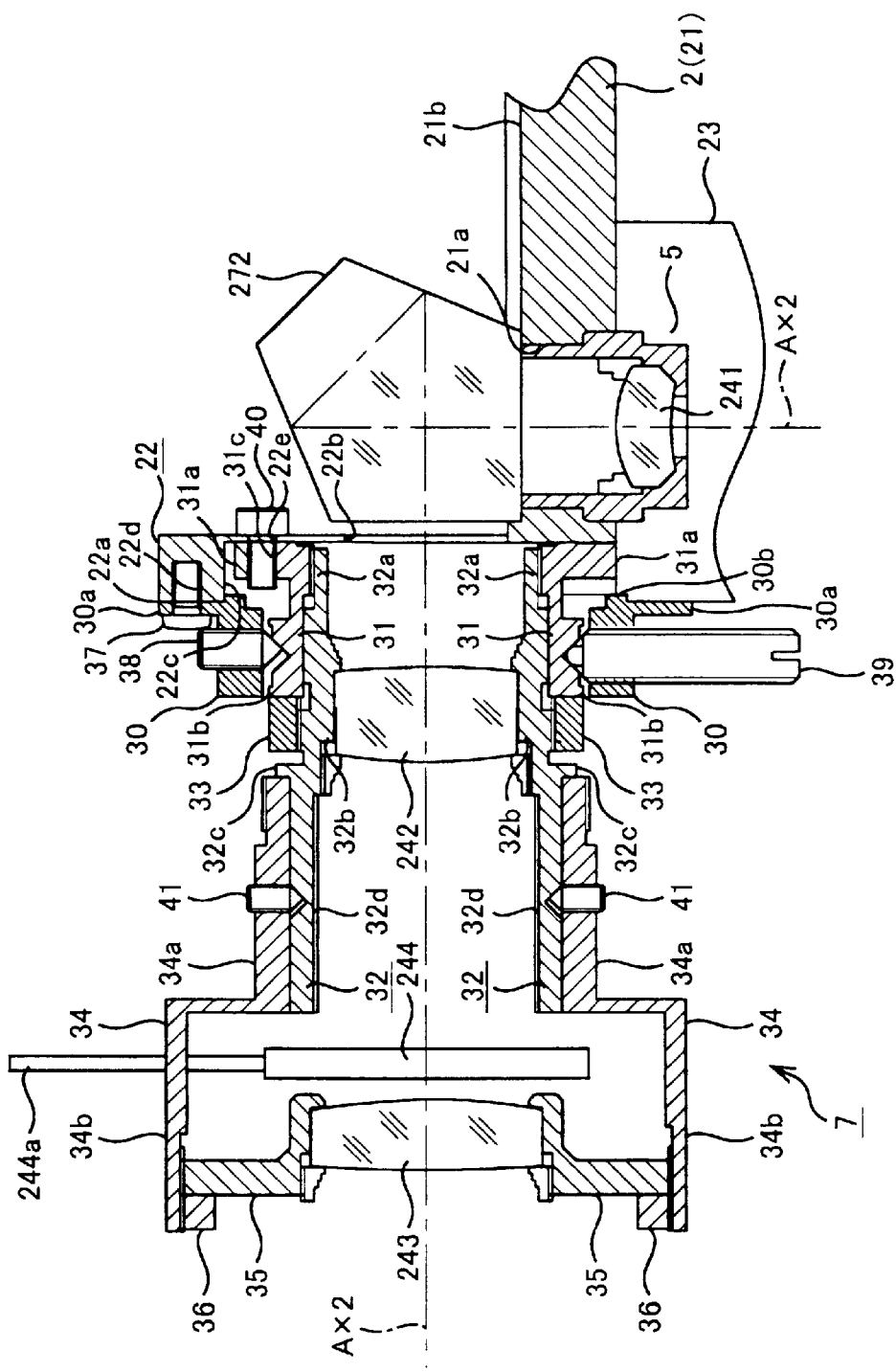
FIG. 20 is a cross-sectional view taken along the optical axis Ax2.

As shown in the FIG. 20, this pentagonal prism base 21 has through holes 21a, 21a, which are disposed symmetrically and which have circular cross-sections with its center at the passing position of the optical axes Ax2, Ax3, respectively, so as to allow the optical axes Ax2, Ax3 of the respective zoom optical systems 220, 230 to pass therethrough when the relay unit 1 is fixed to the housing of the stereoscopic microscope 101. The upper half portion of each through hole 21a is formed as an internal threaded hole, and the lower portion is formed as a spot facing. The respective front lens barrels 5, 6 are fixed to the through holes 21a, 21a, as screwed from the bottom side. The front lens barrels 5, 6 are cylindrical barrels to hold the first lens groups 241, 251 of the relay optical systems 240, 250, respectively. Rear portion of each front lens barrel 5,6 has slightly small diameter than that of the other portions and is formed with an external thread which are screwed into the internal thread of the through holes 21a, 21a.

At the upper side of the pentagonal prism base 21, the through holes 21a, 21a open on the bottom surfaces of two prism fixing grooves 21b, 21b, which are formed along a direction perpendicular to the working reference surface 22a. Each prism fixing groove 21b has a width that is substantially the same as the width of each of the pentagonal prisms 272, 273, and is machined to have a rectangular cross-section. The bottom surface of each prism fixing groove 21b is in parallel with the upper surface of the pentagonal prism base 21. The pentagonal prisms 272, 273 are embedded in the respective prism fixing grooves 21b, 21b, and are in contact with the respective bottoms of the prism fixing grooves 21b, 21b in such a way that the incident surfaces of the pentagonal prisms 272, 273 close the through holes 21a, 21a, respectively. Each of the pentagonal prisms 272, 273 is fixed to the pentagonal prism base 21 by a fixing band 9 hooked on a slope between the first reflecting surface and the second reflecting surface of each pentagonal prism 272, 273. With this construction, each of the optical axes Ax2, Ax3 of the first lens groups 241, 251 is deflected at the right angle within a plane including the center axis of the through hole 21a of the pentagonal prism base 21 and the center axis of the through hole 22b of the mount part 22, and passes through the working reference surface 22a in a direction precisely normal thereto.

At the center of the bottom surface of the pentagonal prism base 21 in the right-to-left direction, a holder support part 23 is formed integrally with and protrusively from the pentagonal prism base 21. The holder support part 23 has a rear end surface which flushes with the working reference surface 22a, two side surfaces which are perpendicular to the working reference surface 22a and to the bottom surface of the pentagonal prism base 21, and a bottom surface which is parallel to the bottom surface of the pentagonal prism base 21. This holder support part 23 holds the above-mentioned pair of the right and left field stop holders 3, 4 such that the positions of the field stop holders 3, 4 are adjustable only in a direction that is parallel to the working reference surface 22a and is perpendicular to the optical axes Ax2, Ax3 of the first lens groups 241, 251. The construction of the holder support part 23 and the field stop holders 3, 4 will be explained, hereinafter.

Figure 14:
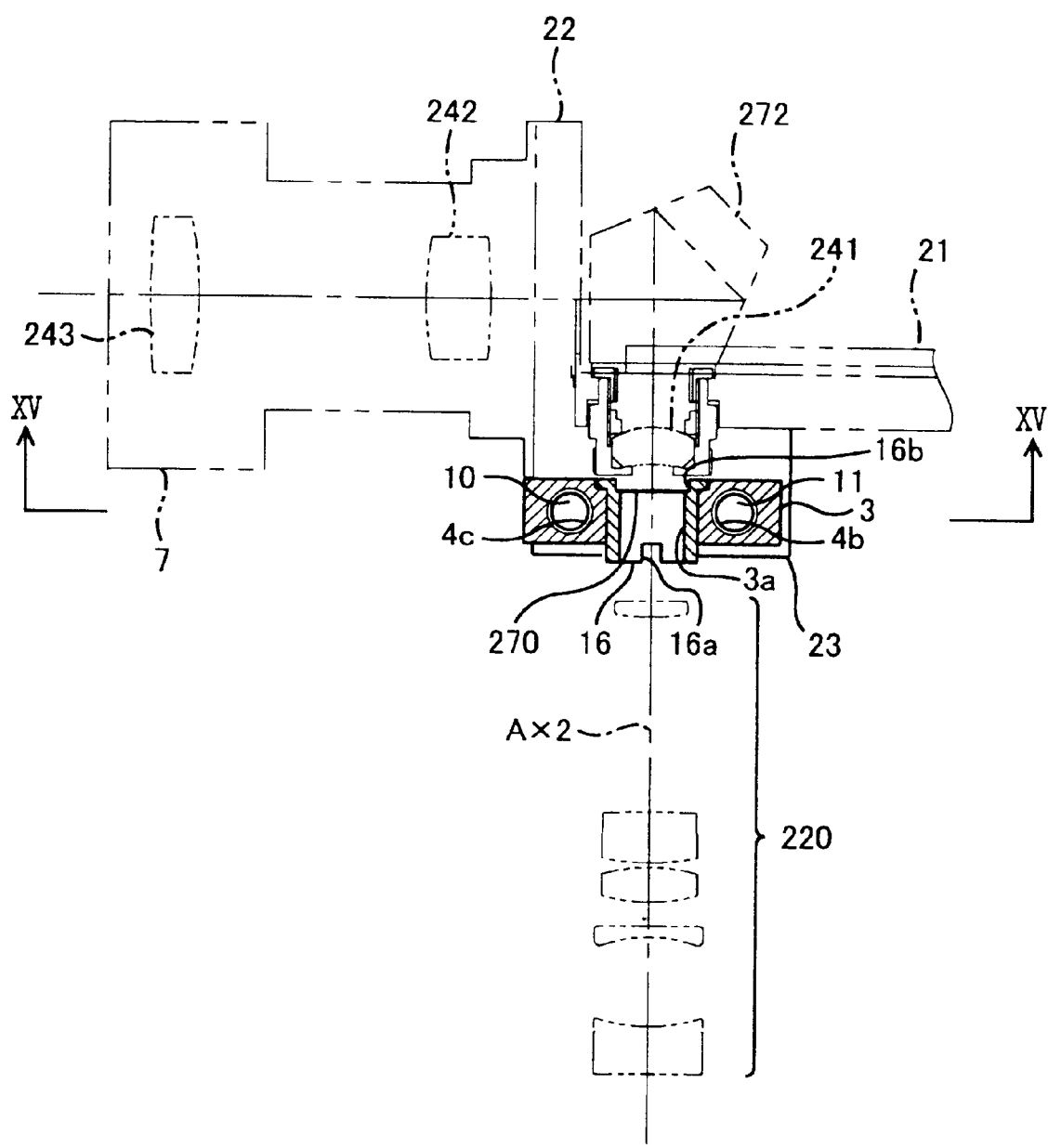
FIG. 14 is a cross-sectional view taken along the optical axis Ax2.
Figure 15:
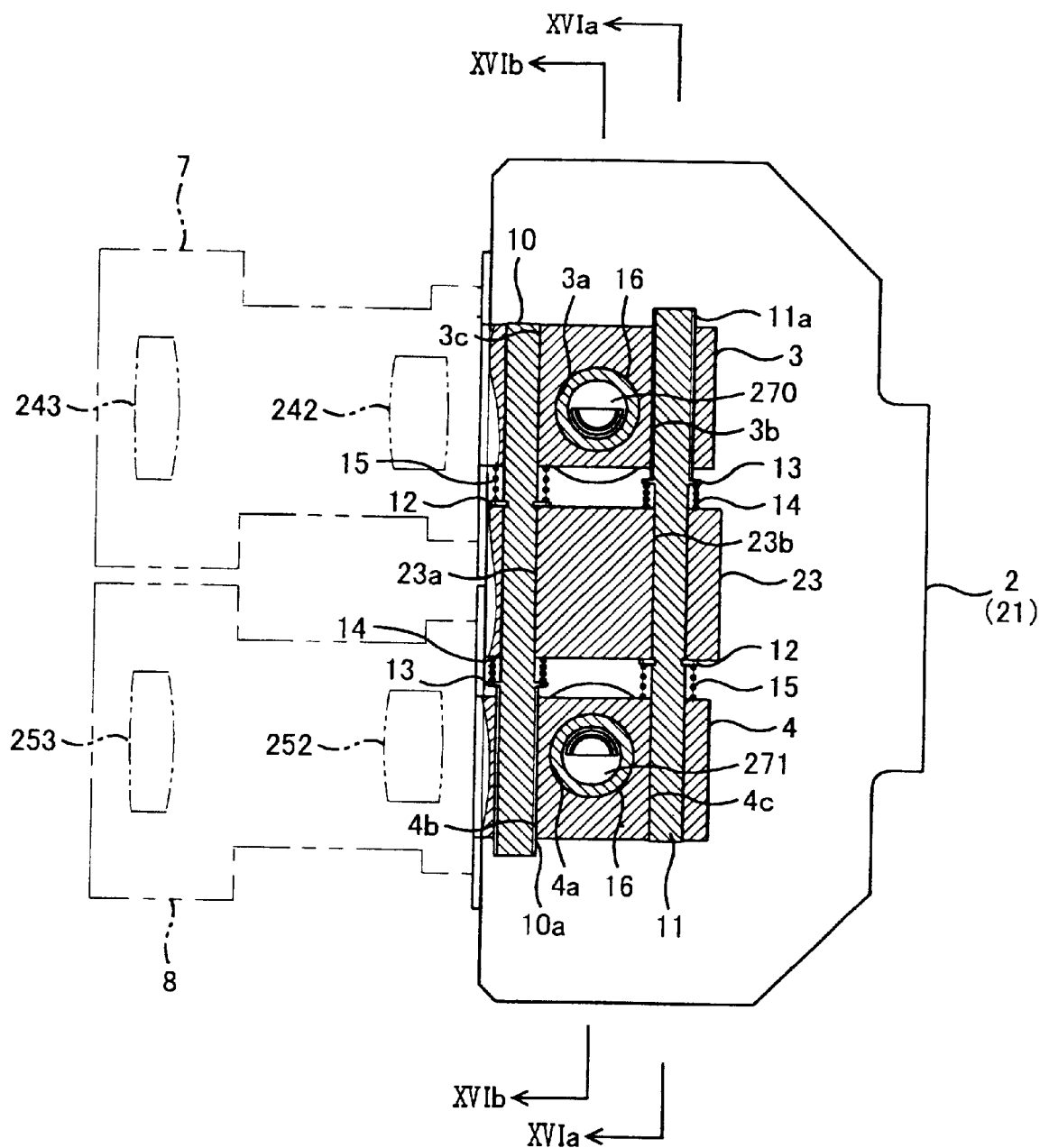
FIG. 15 is a cross-sectional view taken along XV—XV of FIG. 14.
Figure 16:
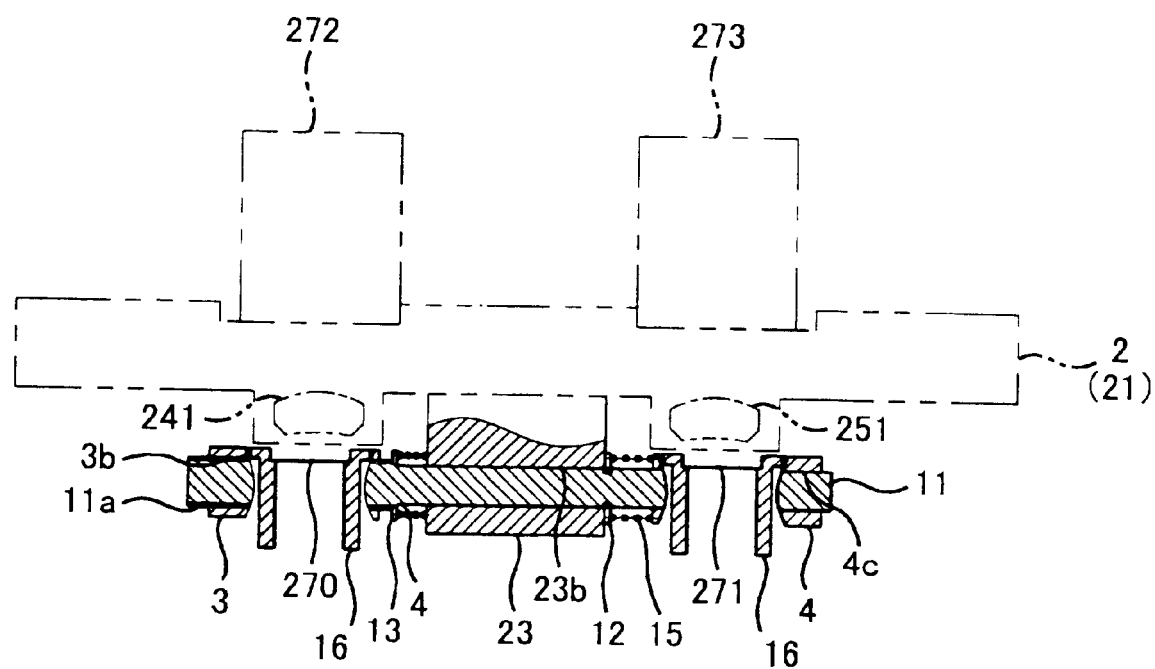
FIG. 16 is a combined cross-sectional view showing a cross-section taken along XVI*a*–XVI*a* and a cross-section taken along XVI*b*–XVI*b* of FIG. 15.

FIG. 14 is a vertical cross-sectional view along a plane including the optical axis Ax2 before and after the pentagonal prism 271. FIG. 15 is a cross-sectional view taken along the XV—XV line of FIG. 14. FIG. 16 is a cross-sectional view combining a cross-section taken along the XVIa—XVIa line and a cross-section taken along the XVIb—XVIb line of FIG. 15. As shown in these cross-sectional views and the perspective view of FIG. 12, two bearing bores 23a, 23b are formed to penetrate the holder support part 23 in such a positional relationship that they extend in a direction perpendicular to the two side surfaces of the holder support part 23 and symmetrically with respect to a plane including both of the optical axes Ax2, Ax3. In the respective bearing bores 23a, 23b, guide pins 10, 11 having substantially the same diameter as that of the bearing bores 23a, 23b are rotatably inserted.

These guide pins 10, 11 have the identical shape with each other, and have protruding external threads 10a, 11a adjacent to one end. The remaining part of each guide pin 10, 11 including the other end is a mere cylindrical shaft. Since the external thread 10a, 11a of each guide pin 10, 11 has a larger diameter than that of the bearing bores 23a, 23b, each guide pin 10, 11 is inserted into the corresponding bearing bore 23a, 23b from the end without the external thread 10a, 11a. Specifically, guide pin 10 is inserted into the bearing bore 23a which is closer to the working reference surface 22a from the opening at the lower side in FIG. 15, and the guide pin 11 is inserted into the bearing bore 23b at the other side from the opening at the upper side in FIG. 15.

Each field stop holder 3, 4 substantially has a flat rectangular-column shape in which the width in right-to-left direction is shorter than the width in the front-to-back direction. Through holes 3a, 4a, inner diameter of which is substantially equal to the outer diameter of the first lens groups 241, 251, are formed at the center of the plane surface of the respective field stop holders 3, 4 along the vertical direction. The openings of the through holes 3a, 4a at the side of the pentagonal prism base 21 are recessed as spot facing with a slightly larger diameter than other portions in the through holes 3a, 4b. At the both sides of the through holes 3a, 4a, screw bore (threaded bores) 3b, 4b and straight bore 3c, 4c are respectively bored in each field stop holders 3, 4. The distance between center axes of the through holes 3a, 4a and the screw bore 3b, 4b in each field stop holders 3, 4 is as long as that between the two bearing bores 23a, 23b in the holder support part 23. The threaded bores 3b, 4b have such an inner diameter that the external threads 10a, 11a of the respective guide pins 10, 11 can be engaged therewith. The straight bores 3c, 4c have an inner diameter that is substantially equal to the diameter of the cylindrical shaft of the respective guide pins 10, 11. In the field stop holder 3, the threaded bore 3b is engaged with the external thread 11a of the guide pin 11, and the cylindrical shaft of the guide pin 10 is inserted into the straight bore 3c. In field stop holder 4, the threaded bore 4b is engaged with the external thread 10a of the guide pin 10, and the guide pin 11 is inserted into the straight bore 4c.

Each of the guide pins 10, 11 is fastened with an E-ring 12, at a position where the E-ring 12 comes in contact with one side surface of the holder support part 23 (that is, the side surface from which the end without the external thread 10a, 11a of the same guide pin 10 or 11 protrudes) in case the external thread 10a, 11a is at a predetermined distance from the other side surface of the holder support part 23. Further, a washer 13 having an inner diameter smaller than the outer diameter of the external thread 10a, 11a is inserted between the external thread 10a, 11a of the guide pin 10, 11 and the side surface of the holder supporting part 23. Between the washer 13 and the same side surface of the holder supporting part 23, a compressive spring 14 is installed. The compressive spring 14 is wound around the each guide pin 10, 11 and urges the corresponding washer 13 in a direction separating from the holder supporting part 23. This construction makes the guide pins 10, 11 impossible to move in their axial direction relative to the bearing bores 23a, 23b of the holder support part 23.

With the construction above, when the guide pin 11 is rotated, the field stop holder 3 is linearly moved along the working reference surface 22a in a direction perpendicular to the optical axis Ax2. At a point during such movement, the center of the through hole 3a intersects the optical axis Ax2. On the other hand, when the guide pine 10 is rotated, the field stop holder 4 is linearly moved along the working reference surface 22a in a direction perpendicular to the optical axis Ax3. At a point during such movement, the center of the through hole 4a intersects the optical axis Ax3. Accordingly, the holder support part 23 and both guide pins 10, 11 function as the support mechanism as a whole.

Further, a compressive spring 15 is wound around the guide pins 10, 11 between the E ring 12 and the side surface of the field stop holder 3, 4 to urge the corresponding field stop holders 3, 4 in a direction away from the holder support part 23. This eliminates errors that may occur due to backlashes between external thread 1a, 11a of the guide pin 10, 11 and the corresponding threaded bore 3b, 4b of each field stop holder 3, 4, whereby the position of each field stop holder 3, 4 can be defined.

A cylindrical field stop frame 16 having an outer diameter substantially equal to the inner diameter of the through holes 3a, 4a is embedded into the through hole 3a, 4a of each field stop holder 3, 4, rotatably with a predetermined friction. At the outer edge of the upper end of each field stop frame 16 (that is, the edge facing the front lens barrels 5,6), a flange is formed to be embedded in the spot facing of the through hole 3a, 4a (FIG. 14). When this flange is embedded in the spot facing of the through hole 3a, 4a, the lower end of each field stop frame 16 slightly protrudes from the bottom surface of the corresponding field stop holder 3, 4. At the lower end of each field stop frame 16, cuts 16a which are to be engaged with the head of a flat-head screwdriver are formed along a direction perpendicular to its center axis. A spot facing 16b is formed at the inner edge of the upper end of each field stop frame 16, which has an inner diameter slightly larger than those of the other parts. The above-mentioned field stops 270, 271 are fitted in the spot facings 16b so as to be perpendicular to the optical axes Ax2, Ax3.

Figure 17:
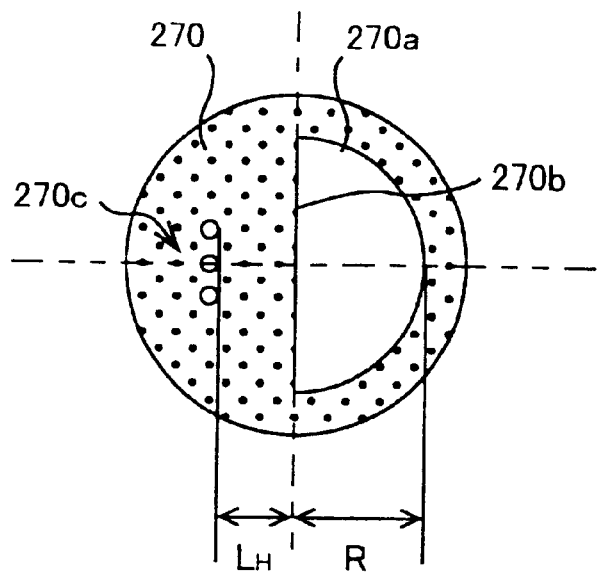
FIG. 17 is a plan view of a field stop.

Since the shapes of the field stops 270, 271 are identical, the detailed shape of the field stop 270 of the right relay optical system 240 will be explained below, the explanation as to the field stop 271 being omitted. FIG. 17 is a plan view of this field stop 270. As shown in FIG. 17, and also as described above, the outer edge of the field stop 270 has a circular shape. In the interior thereof, an aperture 270a having a semi-circular shape defined by a chord (that is, knife edge 270b) that corresponds to a diameter and an arc that is concentric with the outer edge is opened.

Figure 18:
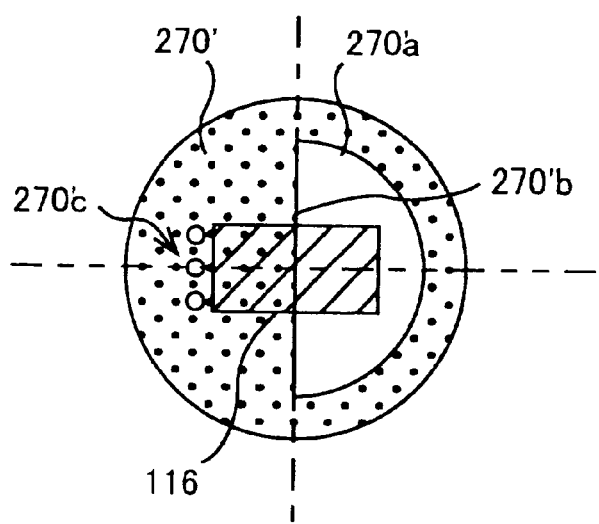
FIG. 18 is a plan view showing the positional relationship between an image of the field stop formed by a relay lens system and the image taking surface of a CCD.
Figure 19:
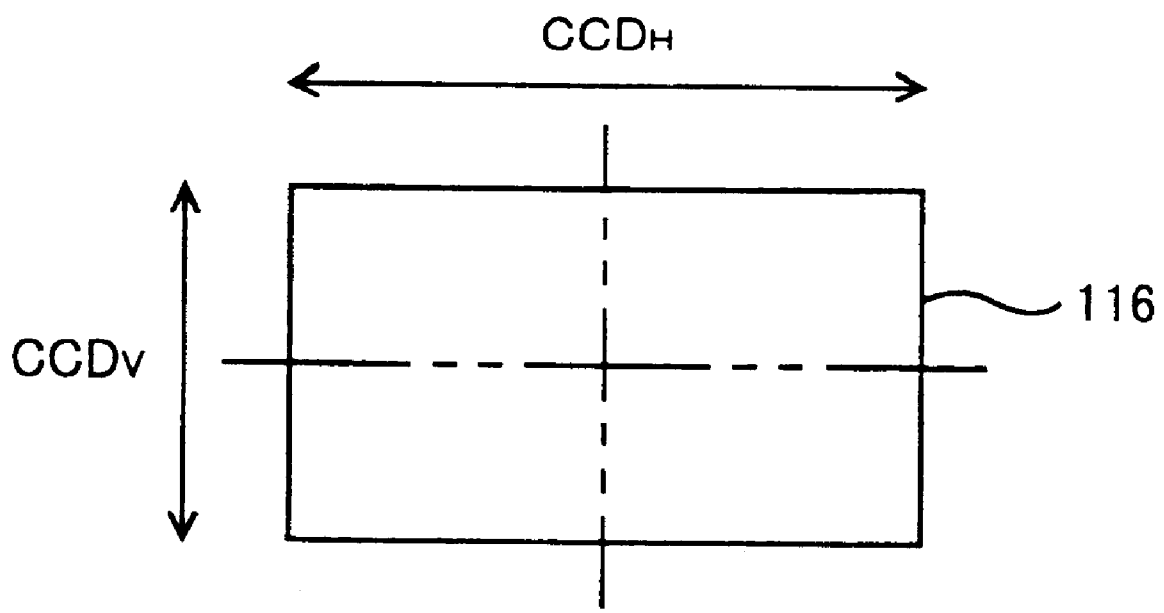
FIG. 19 is a front view of the image taking surface of the CCD.

As described above, under a normal usage condition where the field stop 270 is adjusted at a predetermined position, the image 270' of the field stop 270 is formed on the same plane as the image taking surface of CCD 116 in such a way that the image 270'b of the knife edge 270b coincides with the boarder line of the right and left image taking regions in the image taking surface of the CCD 116, as shown in FIG. 18. At the same time, a half of the field stop 270 on the side opposite to the aperture 270a covers a portion that is conjugate with left image taking region in the image taking surface of the CCD 116, which does not correspond to the right relay optical system 240. The image 270'a of the aperture 270a formed by the right relay optical system 240 must have a sufficient area for completely covering right image taking region of the CCD 116, which corresponds to the right relay optical system 240. Therefore, the radius R of the semi-circular shape of the aperture 270a must satisfy the following relation with horizontally directional width $CCD_H$ of the image taking surface of CCD 116 shown in FIG. 19;

$$R^2 > (CCD_H/m)^2 + (CCD_V/2m)^2 \qquad (1)$$

where m is the magnification of the relay optical system 240.

At the half of the field stop 270 where the aperture 270a is not provided, a marking 270c to be used in adjustment of magnification is formed. The marking 270c is composed of three small-diameter circular holes, which are aligned in parallel with the knife edge 270b. As shown in FIG. 18, under the normal condition where the field stop 270 is adjusted to a predetermined position, the image 270'c of the marking 270c formed by the relay optical system 240 must be located outside of the image taking surface of the CCD 116. Therefore, the spacing $L_H$ between the marking 270c and the knife edge 270b must satisfy the following relation with horizontally directional width $CCD_H$ of the image taking surface of the CCD 116 shown in FIG. 19;

$$L_H > CCD_H/(2 \times m). \qquad (2)$$

Next, the construction of the rear lens barrels 7, 8 will be explained. Since the rear lens barrels 7, 8 have an identical structure, only the rear lens barrel 7 of the right relay optical system 240 will be described, and the explanation of the other rear lens barrel 8 will be omitted.

Figure 21:
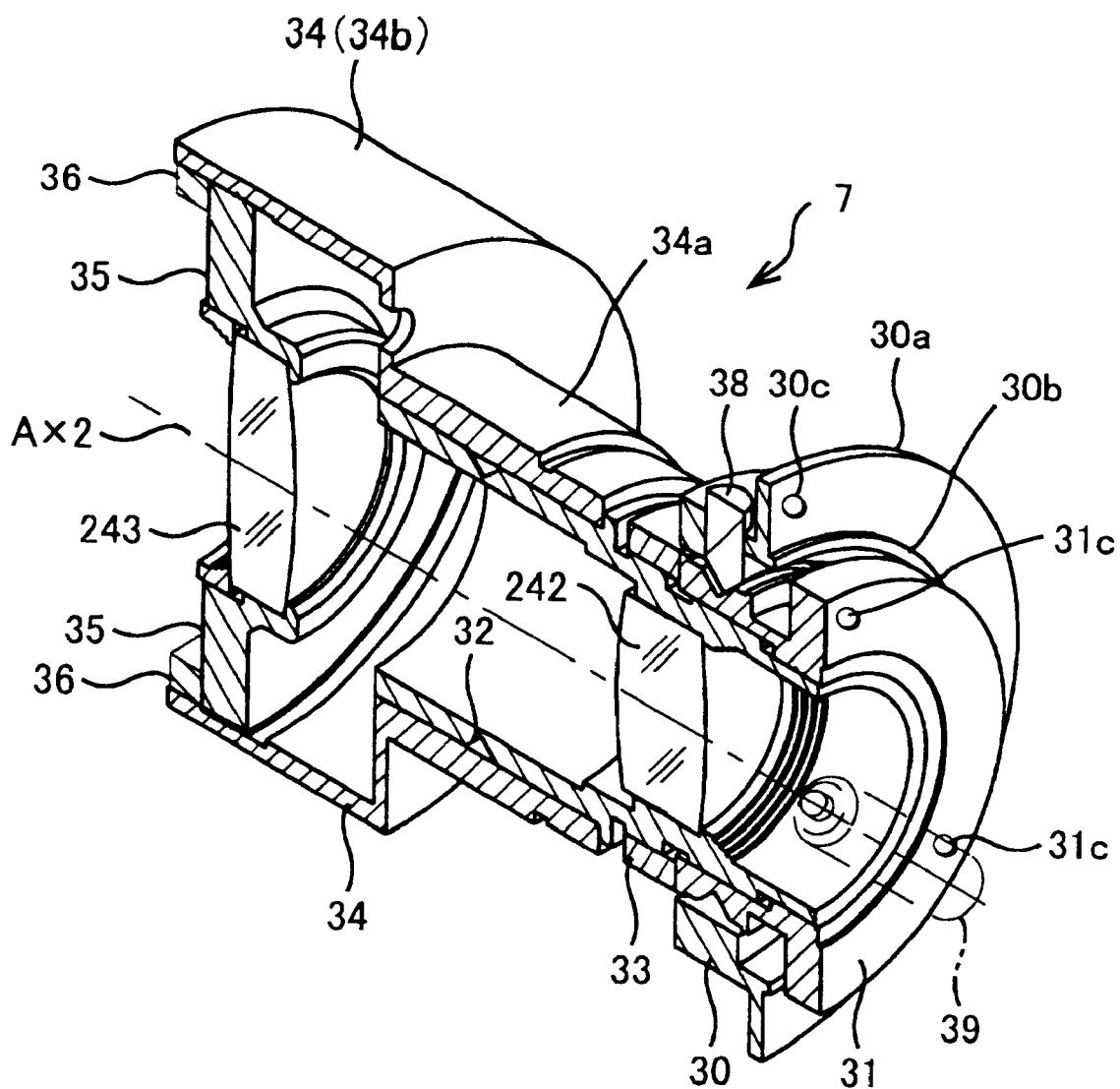
FIG. 21 is a perspective cross-sectional view of a rear lens barrel which is cut out at the cross-section shown in FIG. 20.

FIG. 20 is a cross-sectional view of the relay unit 1 along a plane including the optical axis Ax2 of the right relay lens optical system 240, and FIG. 21 is a perspective view of the cross-section of the rear lens barrel 7, which is sectioned by the plane of FIG. 20. In both of these figures, the right-hand side is referred to as "front side," and the left-hand side is referred to as "rear side."

As shown in FIG. 20 and FIG. 21, the rear lens barrel 7 is composed of a de-center adjustment ring 30 fixed to the periphery of the spot facing 22c of the working reference surface 22a, a second lens frame installation ring 31 which is fixed inside the spot facing 22c and the de-center adjustment ring 30, a second lens frame 32 which is engaged with the inner portion of the second lens frame installation ring 31 through thread engagement and which holds a second lens group 242 in its interior, and a second lens frame fixing ring 33 which is engaged with the outer surface of the second lens frame 32 through thread engagement and which is in contact with the rear end surface of the second lens frame installation ring 31. The rear lens barrel 7 further includes a third lens frame installation ring 34 coupled to the rear end of the second lens frame 32 in a such a way that only rotation is possible, a third lens frame 35 which is engaged with the inner portion of the third lens frame installation ring 34 through thread engagement and which holds a third lens group 243 in its interior, and a third lens frame fixing ring 36 which is engaged with the inner portion of the third lens frame installation ring 34 through thread engagement and which is in contact with the rear end surface of the third lens frame 35. Here, the above-mentioned frames and rings 30 to 36 each have rotationally symmetrical shapes except for the shapes of threaded holes. The detailed shape of each component is explained, hereinafter.

The de-center adjustment ring 30 has a shape in which a fixing flange 30a having a diameter larger than the inner diameter of the spot facing 22c is protrusively formed at the front end of a cylinder having an outer diameter that is substantially equal to the inner diameter of the spot facing 22c. At the front end surface of the de-center adjusting ring 30 including the fixing flange 30a, an annular protrusion 30b having an outer diameter that is substantially equal to the inner diameter of the spot facing 22c is formed. The annular protrusion 30b is fitted in the spot facing 22c, so that the position of de-center adjustment ring 30 is determined with respect to the working reference surface 22a. Besides, holes 30c are formed in the fixing flange 30a such that the holes 30c overlap the respective threaded holes 22d of the working reference surface 22a. The de-center adjustment ring 30 is fixed to the mount part 22 of the base frame 2 by fixing screws 37, which are screwed into the respective threaded holes 22d through the respective holes 30c.

Figure 22:
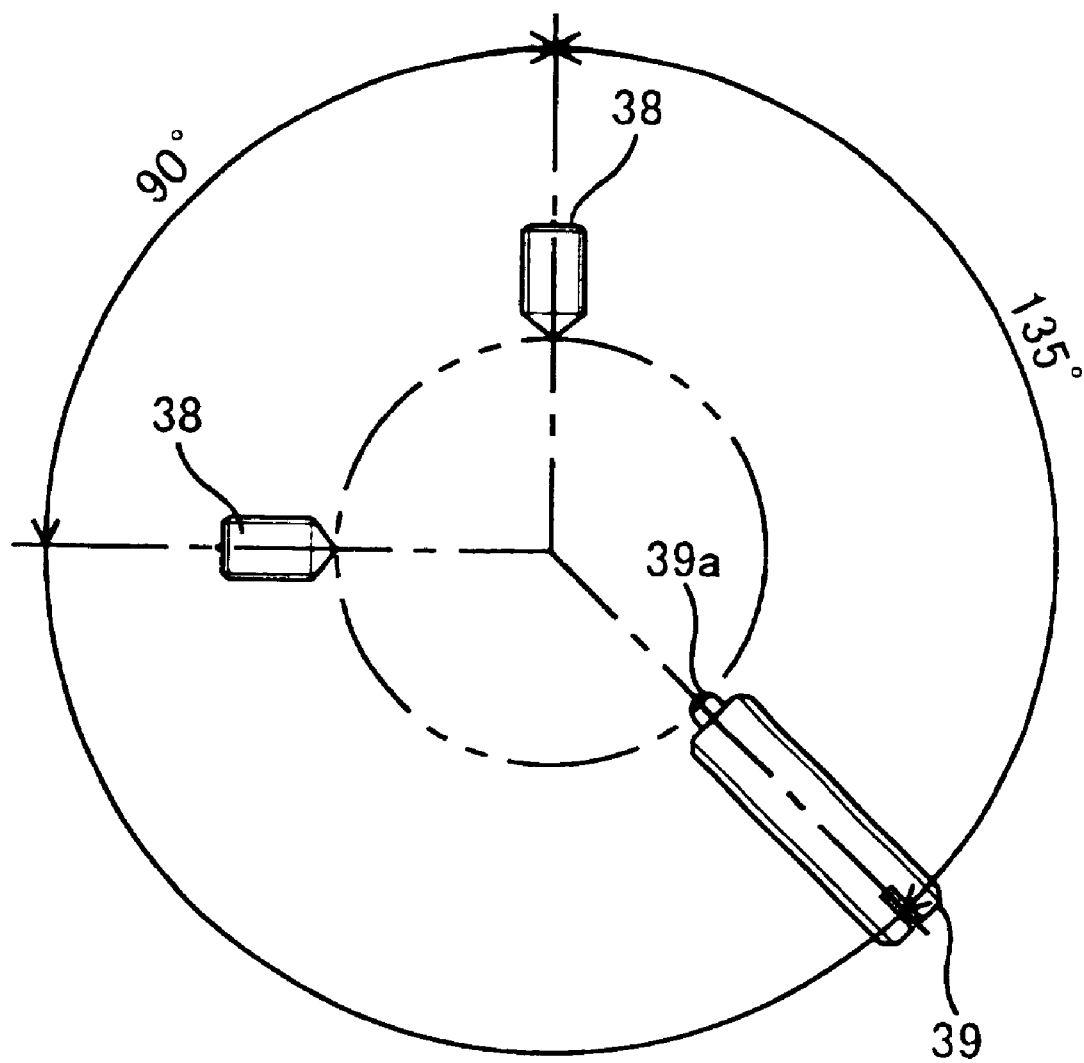
FIG. 22 is an explanatory figure showing the arrangement of de-center adjusting set screws and ball plunger.
Figure 23:
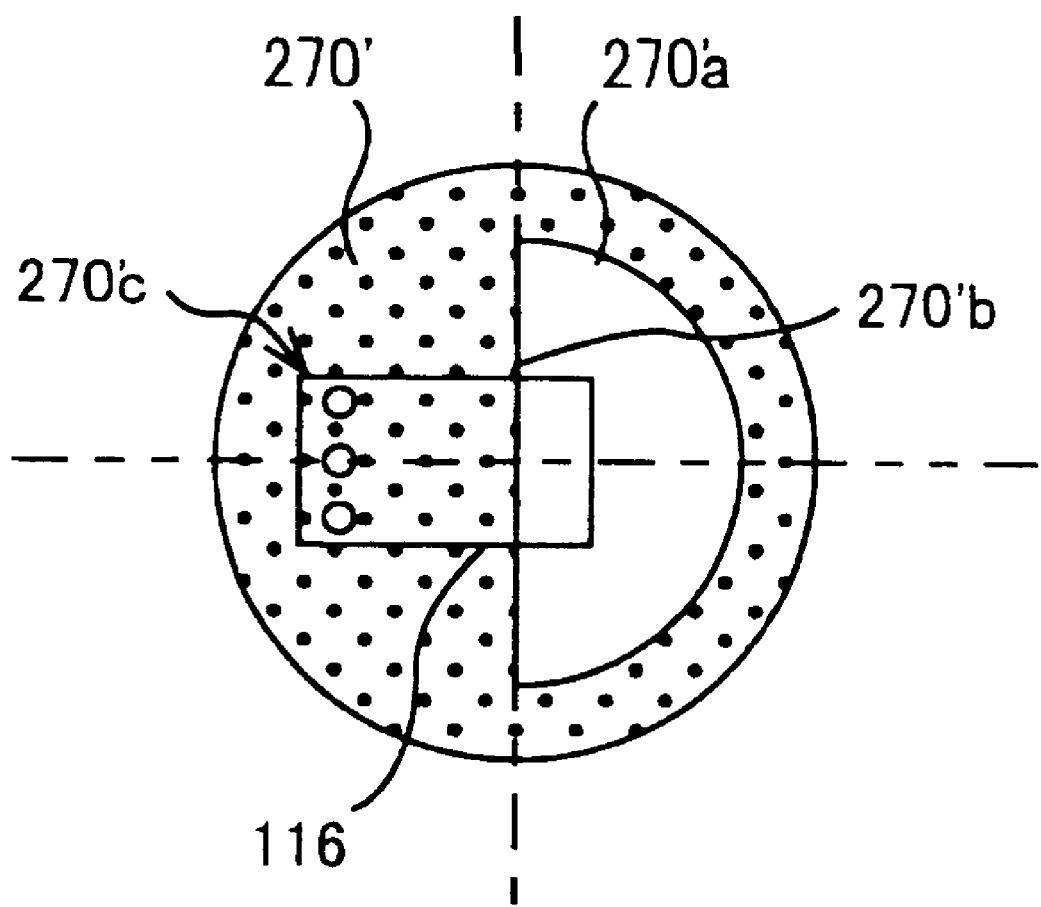
FIG. 23 is an explanatory figure showing movement of the field stop according to the preferred embodiment.

As shown in FIG. 22, at the rear cylindrical part of the de-center adjustment ring 30, two relatively small-diameter threaded holes which are arranged to form 90 degrees angle with respect to the center of the de-center adjustment ring 30 and a relatively large-diameter threaded hole which is arranged to form 135 degrees angle with respect to the relatively small-diameter threaded holes are formed. Two set screws 38, 38 for de-center adjustment are screwed into the respective two relatively small-diameter threaded holes. A ball plunger 39 is screwed into the relatively large-diameter threaded hole. These holes are formed at the respective positions on the same circumference on the outer peripheral surface of the de-center adjustment ring 30, and penetrate towards the center of the ring.

The second frame installation ring 31 has an inner diameter larger than the through hole 22b. At the front end of the second lens frame installation ring 31, a fixing flange 31a having an outer diameter slightly smaller than the inner diameter of the spot facing 22c is protrusively formed. At the rear end of the second lens frame installation ring 31, a de-center adjusting flange 31b having an outer diameter slightly smaller than the inner diameter of the de-center adjustment ring 30 is protrusively formed.

In the fixing flange 31a, threaded holes 31c having a diameter sufficiently smaller than that of the holes 22e are formed such that the threaded holes 31c overlap with the respective holes 22e of the spot facing 22c in case front surface of the fixing flange 31a is in contact with the bottom surface of the spot facing 22c. This second lens frame installation ring 31 is fixed to the mount part 22 by fixing screws 40 that are screwed into the respective threaded holes 31c through the respective holes 22e. Here, the position of the second lens frame installation ring 31 relative to the mount part 22 in a plane perpendicular to the axis can be adjusted within the range of the clearances between the fixing screws 40 and the holes 22e.

In the outer peripheral surface of the de-center adjusting flange 31b, an annular V-shape groove is formed. The tapered surfaces at the tip of the respective set screws 38, 38 and the ball 39a of the ball plunger 39 are in contact with the inner surface of the annular V-groove so as to define the position of the second lens frame installation ring 31 within a plane perpendicular to its axis. The annular V-shape groove has the deepest part slightly offset towards the rear side from the tips of the de-center adjusting set screws 38 and the apex of ball 39a of the ball plunger 39. Accordingly, by appropriately rotating the set screws 38, 38 to push or pull the de-center adjusting flange 31b, the position of the second lens frame installation ring 31 can be adjusted in the plane perpendicular to its axis. Here, during this positional adjustment, the ball 39a of the ball plunger 39 is retracted or protruded in accordance with the movement of the de-center adjusting flange 31b, and constantly urges the de-center adjusting flange 31b towards the set screws 38, 38. If the set screws 38 are adjusted beyond the reach of the ball 39a of the ball plunger 39, the ball plunger 39 itself is to be rotated to adjust the position of the ball 39a in accordance with the position of the set screws 38.

An internal thread is protrusively formed on the inner surface of the second lens frame installation ring 31 adjacent to the front end thereof.

The second lens frame 32 has an inner diameter larger than the through hole 22b. The above-mentioned second lens group 242 is held in the interior of the second lens frame 32. The outer surface of the second lens frame 32 is divided into a small diameter part 32a, which has an outer diameter that is substantially equal to the inner diameter of the second lens frame installation ring 31 so as to be inserted into the second lens frame installation ring 31, an intermediate diameter part 32b having an external thread of a slightly larger diameter than the small diameter part 32a, a flange 32c adjoining the intermediate diameter part 32d and a large diameter part 32d adjoining to the flange 32c.

An external thread is formed at the tip of the small diameter part 32a to be engaged with the internal thread formed inside the second lens frame installation ring 31. Accordingly, the second lens frame 32 can be rotated relative to the second lens frame installation ring 31 in order to adjust the position of the second lens frame 32 along the axis direction.

The external thread of the intermediate diameter part 32b is engaged with the internal thread formed on the inner surface of the second lens frame fixing ring 33. Thus, the second lens frame fixing ring 33 is screwed onto the external thread of the intermediate diameter part 32b until the second lens frame fixing ring 33 is in contact with the rear end surface of the second lens frame installation ring 31 so as to causing the internal thread of the second lens frame installation ring 31 to be tightly engaged with the external thread of the small diameter part 32a, so that the second lens frame 32 is secured with respect to the second lens frame installation ring 31.

At the substantial center in the axis direction on the outer peripheral surface of the large diameter part 32d, an annular V-groove is formed in its entire circumference.

The third lens frame installation ring 34 is divided into a small diameter part 34a having an inner diameter that is substantially equal to the outer diameter of the large diameter part 32d of the second lens frame 32, and a large diameter part 34b having a diameter sufficiently larger than the small diameter part 34a.

The small diameter part 34a is rotatably coupled with the large diameter part 32d of the second lens frame 32, and the front end of the small diameter part 34a is in contact with the flange 32c. A plurality of threaded holes into which set screws 41 are screwed is formed on the circumference of the small diameter part 34a at positions that are to overlap with the V-groove of the second lens frame 32 when the front end of the small diameter part 34a is in contact with the flange 32c. The tips of the set screws 41 are inserted into the V-groove of the second lens frame 32. This prevents the third lens frame installation ring 34 from being removed from the second lens frame 32. The set screws 41 secured further, the tips of the set screws 41 become in contact with the inner surface of the V-groove of the second lens frame 32 and prevent rotation of the third lens frame installation ring 34 relative to the second lens frame 32.

The above-mentioned aperture stop 244 is fixed to the interior of the large diameter part 34b. An operation rod 244a extends from this aperture stop 244, and penetrates the large diameter part 34b. Furthermore, the inner surface of the large diameter part 34b adjacent to its rear end is threaded.

The third lens frame 35 has a shape of substantially circular plate of which outer diameter is substantially equal to the inner diameter of the large diameter part 34b of the third lens frame installation ring 34, and holds the third lens group 243 at its center concentrically. An external thread is formed on the outer peripheral surface of the third lens frame 35 to be engaged with the internal thread of the large diameter part 34b of the third lens frame installation ring 34. Accordingly, the position of the third lens frame 35 in the axis direction can be adjusted by rotating the third lens frame 35 relative to the third lens frame installation ring 34.

The third lens frame fixing ring 36, having an external thread on the outer peripheral surface thereof, is screwed into the internal thread of the large diameter part 34b of the third lens frame installation ring 34 until the third lens frame fixing ring 36 is in contact with the rear end surface of the third lens frame 35. This causes the internal thread of the third lens frame installation ring 34 to be tightly engaged with the external thread of the third lens frame 35, so that the third lens frame 35 is secured with respect to the third lens frame installation ring 34.

The Assembly and Adjustment of the Video-type Stereoscopic Microscope

Next, processes for assembly and adjustment of the stereoscopic microscope 101 having the above-mentioned construction will be explained. First, an operator assembles a pair of the zoom optical systems 220, 230, the close-up optical system 210, and the illuminating optical system 300 into respective lens barrels (not shown) that are prepared individually and performs alignment of optical elements in each barrel, outside the housing of the stereoscopic microscope 101. Also, the operator fixes each of the lens barrels of the pair of the zoom optical systems 220, 230 to a bracket (not shown) such that the respective zoom magnifications are set to be the same, and that the optical axes thereof are in parallel with each other.

Next, the operator assembles the relay unit 1 except for the pentagonal prisms 272, 273 and the rear lens barrels 7, 8 in a manner described above, outside the housing of the stereoscopic microscope 101.

Then, the operator fixes this relay unit 1 on an X-Y table (not shown). At this time, the working reference surface 22a of the base frame 2 is positioned perpendicularly to the surface of the X-Y table. Then, the operator adjusts the position of this X-Y table appropriately so as to enter the working reference surface 22a within the field of view of an optical microscope (not shown), which is fixed to the base of the X-Y table in such a way that its optical axis is normal to the surface of the X-Y table, and thereafter measures the angle A formed between the working reference surface 22a and a predetermined reference line.

Next, the operator adjusts the position of the X-Y table so as to enter one field stop 270 within the field of view. The operator then rotates the field stop frame 16, which holds the field stop 270 with a flat-head screwdriver in an appropriate manner so that the aperture 270a is positioned on the side closer to the other field stop 271, and that its knife edge 270b is directed in a direction that is offset by 90-degree from the angle A relative to the predetermined reference line. As a result, the knife edge 270b is made perpendicular to the working reference surface 22a.

Next, the operator adjusts the position of the X-Y table so as to enter the other field stop 271 within the field of view. The operator then rotates the field stop frame 16, which holds the field stop 271 with a flat-head screwdriver in an appropriate manner so that the aperture 271a is positioned on the side closer to the other field stop 270, and that its knife edge 271b is directed in a direction that is offset by 90-degree from the angle A relative to the predetermined reference line. As a result, the knife edge 271b is made perpendicular to the working reference surface 22a and in parallel with the knife edge 270b of the other field stop 270.

After completing the angle adjustment of the knife edges 270b, 271b in the manner described above, the operator fixes both pentagonal prisms 272, 273 and both rear lens barrels 7, 8 in the relay unit 1. However, at this point, since further adjustments are not yet performed, the operator temporarily fastens each fixing screw 40 so that the second lens frame installation ring 31 is adjustable with respect to the mount part 22 and the de-center adjustment ring 30. Similarly, the second lens frame fixing ring 33 is loosened so that the second lens frame 32 can be rotated with respect to the second lens frame installation ring 31. Further, the third lens frame fixing ring 36 is loosened so that the third lens frame 35 can be rotated with respect to the third lens frame installation ring 34. Further, each of the set screws 41 are loosened so that the third lens frame installation ring 34 can be rotated with respect to the second lens frame 32.

Next, the operator fixes the respective barrels of the zoom optical systems 220, 230 and the relay unit 1 to the interior of the housing of the stereoscopic microscope 101, and fixes the high definition CCD camera 102 to the stereoscopic microscope 101. With this construction, a monitor 114 receives high definition signal from the high definition CCD camera 102, and displays the right and left images. However, at this stage, the positions of the respective knife edges 270b, 271b of the field stops 270, 271 do not always coincide with each other, although they are in parallel with each other in a plane including the image taking surface of the CCD 116. Moreover, the image-circles formed by the respective relay lens systems 240, 250 are not always arranged side by side on the CCD 116. Furthermore, the sizes of the image-circles of secondary images are not always the same as each other at this point.

Then, the operator first rotates the third lens frames 35 relative to the third lens frame installation rings 34 appropriately to move the third lens groups 243, 253 in the direction of the optical axis, so that the focal conditions of the images 270', 271' of the field stops 270, 271 on the CCD 116 may be adjusted. As a result, these images 270', 271' can be clearly displayed on the monitor 114.

Next, the operator appropriately rotates the guide pins 10, 11 to move the field stop holders 3, 4 (in some cases, additionally adjusts the de-center adjusting set screws 38 of the rear lens barrel 7, 8) so that the markings 270c, 271c of the field stops 270, 271 are placed at positions adjacent to the respective optical axes Ax2, Ax3 and conjugate with the image taking surface of the CCD 116 with respect to the relay optical systems 240, 250, where by the images 270'c, 271'c formed by the respective relay optical systems 240, 250 are picked up by the CCD 116, respectively. In this time, since the mechanism for rotating the field stop 270, 271 operates independently of the mechanism for moving the field stop 270, 271 linearly, the markings 270c, 271c can be moved linearly while maintaining the parallelism between the knife edges 270b, 271b.

Once the images 270'c, 271'c of the markings 270c, 271c are picked up by the CCD 116, the operator measures the widths of the images 270'c, 271'c of the markings 270c, 271c on the monitor 114. Then, the operator rotates the second lens frame 32 of one rear lens barrel 7 (or 8) to move the second lens group 242 (or 252) and the third lens group 243 (or 253) in the direction of the optical axis, in order to change the total focal distance of the first lens group 241 (or 251) and the second lens group 242 (or 252), in other words, the magnification of the relay optical system 240 (or 250). Once the rotation of the second lens frame 32 is completed, the operator rotates the third lens frame installation ring 34 relative to the second lens frame 32 in order to return the third lens frame installation ring 34 to its original rotational position, so that the original orientation of the operation rod 244a is recovered. Then, the operator appropriately rotates the third lens frame 35 relative to the third lens frame installation ring 34 to move the third lens group 243 (or 253) in the optical axis direction, in order to re-adjust the focal condition of the image 270'c (or 271'c) on the CCD 116. Once these adjustments of the sizes of the images 270'c, 271'c of the markings 270c, 271c are completed in this manner, the operator measures again the sizes of the both images 270'c, 271'c displayed on the monitor 114. The operator repeats the above-mentioned steps until the sizes of the images 270'c, 271'c become the same as each other.

When the sizes of the images 270'c, 271'c of the both markings 270c, 271c displayed on the monitor 114 becomes identical as a result of repeating these procedures, the magnifications of both relay optical systems 240, 250 become the same as each other, and the resulting positions of both field stops 270, 271 become respectively conjugate with the position of the image taking surface of the CCD 116, in other words, both filed stops 270, 271 become respectively in focus on the CCD 116. Then, the operator screws the second lens frame fixing ring 33 so that the second lens frame 32 is fixed to the second lens frame installation ring 31, screws each of the set screws 41 so that the third lens frame installation ring 34 is fixed to the second lens frame 32, and screws the third lens frame fixing ring 36 so that the third lens frame 35 is fixed to the third lens frame installation ring 34.

As described above, the markings 270c, 271c are formed in the field stops 270, 271 to be used as references for magnification adjustment of the respective relay optical systems 240, 250. Accordingly, the operator can easily match the magnifications of both relay optical systems 240, 250 with each other by matching the sizes of the images 270'c, 271'c of these markings 270c, 271c with each other.

Next, the operator appropriately rotates the guide pins 10, 11 to move the field stop holders 3, 4, in the directions separating from each other, so that the images 270'b, 271'b of the apertures 270b, 271b of the respective field stops 270, 271 are formed side by side on the CCD 116. However, at this point, the images of the knife edges 270c, 271c may not to be matched with each other.

Next, the operator disposes a pair of autocollimators in the front of the optical axis Ax2, Ax3 of respective zoom optical system 220, 230 and project images of targets in the autocollimators towards the respective zoom optical system 220, 230. However, at this point, since the flange-back of each zoom optical system 220, 230 does not always coincident with the position of the field stop 270, 271, the target image which is picked up by the CCD 116 and displayed on the monitor 114 is not always in focus. Thus, the operator appropriately moves the lens barrels of the zoom optical systems 220, 230 relative to the brackets (not shown) in the direction of the optical axis so that the primary images of the targets may be formed on the same plane as the field stops 270, 271, and that the corresponding secondary images may be formed on the image taking surface of the CCD 116. Accordingly, the flange-back of the zoom optical system 220, 230 can be adjusted.

Here, the center of each of the target images formed on the CCD 116 indicates the position of the corresponding optical axis Ax2, Ax3. The position of the optical axis Ax2, Ax3 can be adjusted by moving the corresponding second lens group 242, 252 in a direction perpendicular to that optical axis. Thus, the operator moves the second lens frame installation ring 31 of one rear lens barrel 7 in a plane perpendicular to the optical axis by retracting or protruding each of the de-center adjusting set screws 38, 38 in appropriate direction which are screwed into the de-center adjustment ring 30 of the rear lens barrel 7, so that the center of the target image (that is, secondary image) formed by the right relay optical system 240 in the rear lens barrel 7 coincides with the center of the left image taking region on the image taking surface of the CCD 116 (i.e., the center of the left half of the monitor 114). Similarly, the operator moves the second lens frame installation ring 31 of the other rear lens barrel 8 in a plane perpendicular to the optical axis by retracting or protruding each of the de-center adjustment-use set screws 38, 38, which are screwed into the de-center adjustment ring 30 of the other rear lens barrel 8, so that the center of the target image (that is, secondary image) formed by the left relay optical system 250 of the rear lens barrel 8 coincides with the center of the right image taking region on the image taking surface of the CCD 116 (i.e., the center of the right half of the monitor 114).

Through these adjustments, as described above, the optical axes Ax2, Ax3 of the relay optical systems 240, 250 become parallel to each other. The operator then tightens each of the fixing screws 40 to fix the second lens frame fixing rings 31 of the rear lens barrels 7, 8 to the mount part 22.

Next, the operator appropriately rotates each of the guide pins 10, 11 to move each of the field stops holders 3, 4, to a respective predetermined position, so that each of the knife edges 270b, 271b of the field stops 270, 271 may coincide with the center of the image taking surface of the CCD 116 (i.e., the center of the monitor 114). Accordingly, a portion of the image-circle formed at the position of each field stop 270, 271 is shielded by the corresponding knife edge 270b, 2701b. Thus, the partially shielded images are re-formed onto the image taking surface of the CCD 116 through the respective relay optical systems 240, 250, respectively. Accordingly, the right and left images are arranged at the right and the left on the CCD 116 without any overlap.

Finally, the operator assembles the lens barrel of the close-up optical system 210 into the housing of the stereoscopic microscope 101, thereby completing the stereoscopic microscope 101.

As explained above, according to the video-type stereoscopic microscope of the present invention, the adjustment to angle and position of the field stop can be conducted independently without affecting the other. As a result, it becomes possible to conduct these adjustments with ease.

The present disclosure relates to the subject matters contained in Japanese Patent Application No. Hei 11-150833 filed on May 31, 1999, which is expressly incorporated herein by reference in its entireties.

We claim:

1. A video-type stereoscopic microscope in which images of same object are formed through a pair of image taking optical systems arranged with a predetermined base length therebetween on two regions into which an image taking surface of an image pickup device is divided in a direction of said base length, and in which the images are picked up by said image pickup device, each of said image taking optical systems comprising:

an objective optical system that forms a primary image of an object;

a relay optical system that relays the primary image formed by said objective optical system to form a secondary image;

an inter-axis distance reducing element that brings the object light rays from said relay optical system close to each other;

a field stop that shields a space which is conjugate, with respect to said relay optical system, with a region in said image taking surface that corresponds to the other image taking optical system, when disposed at a predetermined position in a plane on which said primary image is formed by said objective optical system;

a field stop frame that holds said field stop in its inner space;

a field stop holder that holds said field stop frame such that said field stop frame can be rotated in a plane perpendicular to an optical axis of said objective optical system; and a support mechanism that supports said field stop holder such that said field stop holder can slide in a direction perpendicular to the optical axis of said objective optical system while maintaining an rotational axis of said field stop frame in parallel with the optical axis of said objective optical system.

2. The video-type stereoscopic microscope according to claim 1, wherein said field stop frame has a substantially cylindrical shape.

3. The video-type stereoscopic microscope according to claim 1, wherein a center axis of said field stop frame coincides with the optical axis of said objective optical system at a point during sliding of said field stop holder by said support mechanism.

4. The video-type stereoscopic microscope according to claim 1, wherein said support mechanism includes:

a frame fixed to said image pickup device; and a pair of guide pins which penetrate said field stop holder in a manner movable in their axial direction with respect to said field stop holders and which are held by the frame so that they cannot move in their axial direction with respect to the frame.

5. The video-type stereoscopic microscope according to claim 4, wherein said pair of guide pins comprises a screw engaged with said field stop holders and a shaft that is slidable in an axial direction relative to said filed stop holders.

6. The video-type stereoscopic microscope according to claim 5, wherein said support mechanism is common to each image taking optical system and wherein an external thread for the field stop holder of one image taking optical system and a shaft for the field stop holder of the other image taking optical system are formed on the respective ends of each guide pin.

7. The video-type stereoscopic microscope according to claim 4, wherein said relay optical system is fixed to said frame.

8. The video-type stereoscopic microscope according to claim 4, wherein said pair of guide pins are disposed on both sides of said field stop frame respectively.

9. The video-type stereoscopic microscope according to claim 1, wherein a marking is formed on said field stop at a position conjugate with the exterior of said image taking surface with respect to said relay optical system when said field stop is positioned at said predetermined position, and wherein said support mechanism moves said field stop between said predetermined position and a position where said marking becomes conjugate with the interior of said image taking surface with respect to said relay optical system.

10. The video-type stereoscopic microscope according to claim 9, wherein said marking includes a hole formed in said field stop.

11. The video-type stereoscopic microscope according to claim 10, wherein said marking includes a plurality of holes formed in said field stop.

* * * * *